United States Patent [19]
Ogata et al.

[11] Patent Number: 5,327,535
[45] Date of Patent: Jul. 5, 1994

[54] MAGNETIC RECORDING CONTROL APPARATUS

[75] Inventors: Mikito Ogata, Minamiashigara; Takahiko Nakamura, Fujisawa; Toshifumi Nishimura, Minamiashigara, all of Japan

[73] Assignees: Hitachi, Ltd., Tokyo; Hitachi Computer Engineering Co., Ltd., Kanagawa, both of Japan

[21] Appl. No.: 935,843

[22] Filed: Aug. 25, 1992

[30] Foreign Application Priority Data

Aug. 29, 1991 [JP] Japan .................................. 3-217760
Sep. 12, 1991 [JP] Japan .................................. 3-260435

[51] Int. Cl.⁵ .............................................. G06F 15/02
[52] U.S. Cl. ..................................... 395/275; 395/250; 395/425
[58] Field of Search ........................ 395/275, 250, 425

[56] References Cited

U.S. PATENT DOCUMENTS 5,163,134  11/1992  Kakuse et al. ................... 395/275

FOREIGN PATENT DOCUMENTS 57-152028  9/1982  Japan .
57-158008  9/1982  Japan .

Primary Examiner—Dale M. Shaw
Assistant Examiner—Moustafa M. Meky
Attorney, Agent, or Firm—Kenyon & Kenyon

[57] ABSTRACT

A magnetic recording control apparatus includes conventional magnetic recording media, a large capacity type magnetic recording medium having a memory capacity corresponding to the sum of the capacities of a plurality of conventional magnetic recording media, recording unit for recording data of a plurality of conventional magnetic recording media to the large capacity type magnetic recording medium using a virtual volume corresponding to the recording capacity of one conventional magnetic recording medium and control data relating to the virtual volume as one recording unit, and/or division unit for dividing a data buffer for temporarily storing the data of the large capacity type magnetic recording medium into logical devices corresponding to the conventional magnetic recording media.

16 Claims, 17 Drawing Sheets

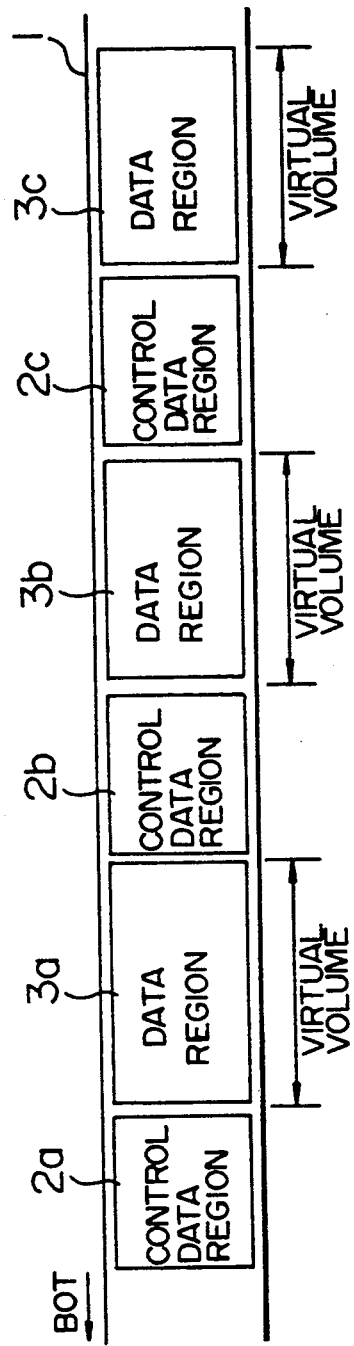
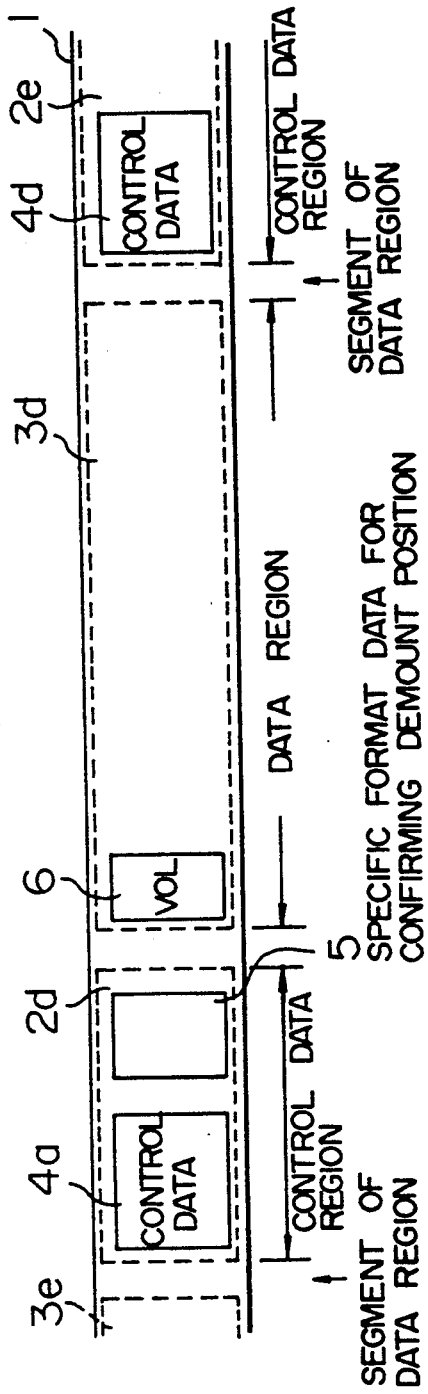

FIG. 3

| VIRTUAL VOLUME IDENTIFIER | VIRTUAL VOLUME POSITIONING DATA | VOLUME NAME OF VIRTUAL VOLUME | DATA MANAGEMENT DATA |
|---|---|---|---|
| | | | |
| | | | |
| | | | |
| ∫ | ∫ | ∫ | ∫ |
| | | | |

FIG. 4

ERASE NUMBER COUNTER — 10

FIG. 13

| LOGICAL DEVICE ADDRESS | LOGICAL DEVICE IN-USE FLAG | CONTROL DATA ON MAGNETIC TAPE |
|---|---|---|
| 0 | | |
| 1 | | |
| ~ | | |
| n | | |

RD/WR COMMAND PROCESSING

DEMOUNT REQUEST PROCESSING

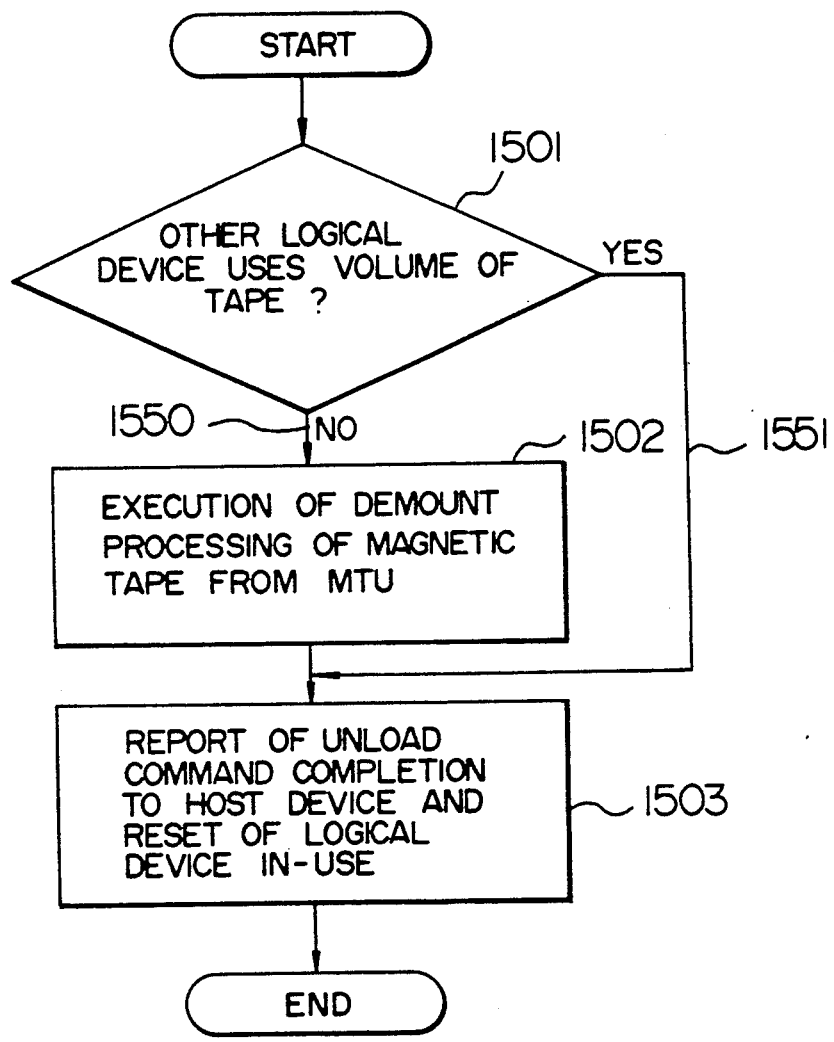

MAGNETIC RECORDING CONTROL APPARATUS

BACKGROUND OF THE INVENTION

This invention relates to a magnetic recording control apparatus for managing and controlling data of a large capacity magnetic recording medium.

Hereinafter, the description will be given referring to magnetic tape as an example of the magnetic recording medium.

In recent magnetic tape sub-systems, a multi-file system is known for recording a plurality of files on one tape to reduce the number of physical media that need to be stored.

JP-A-57-158008 discloses a system for allotting an address to each block on a magnetic tape medium and for making high speed location at the time of recovery of failure.

In recent magnetic tape sub-systems, a bulk write system, which includes an IC memory as a data buffer, stores data in the data buffer and then writes the data on the tape, and a pre-read or pushup read processing system which reads in advance data on the tape to a data buffer are known. The capacity of one magnetic tape has thus been increased due to the improvement in recording density and compression and interconnection of data blocks. Accordingly, although the data capacity (hereinafter referred to as the "capacity") of magnetic tapes that have been used practically (hereinafter referred to as the "conventional magnetic tape" or the "ordinary magnetic tape") has been at most about 200 megabytes, a magnetic tape cartridge having a memory capacity more than ten times as much as that of the conventional magnetic tapes (hereinafter referred to as the "large capacity magnetic tape") has been developed using this "data buffer" technique.

On the other hand, JP-A-57-152028 discloses a data control system by the division of a data buffer.

SUMMARY OF THE INVENTION

The present invention provides a magnetic recording control apparatus which makes it possible to effect high speed location to a virtual volume on a magnetic recording medium for which a mount request is generated in the magnetic recording medium, without applying any load to a central processing unit, and which can execute management and processing of the magnetic recording medium, as viewed from the side of the central processing unit, by the use of the magnetic recording medium without changing the management and processing of conventional magnetic recording media.

The present invention also provides a magnetic recording control apparatus which solves the problems with the prior art described above, and which can improve processing efficiency by effecting simultaneously and in parallel a plurality of processing operations for a plurality of virtual volumes on a magnetic recording medium, for which a write/read request is generated or for which a mount request is generated, and processing for a plurality of virtual volumes on a large capacity magnetic recording medium having the same capacity, without changing the management and processing method of the conventional magnetic recording media on a central processing unit (host device ) without applying a load to the central processing unit.

Hereinafter, the explanation will be given on the magnetic tape by way of example.

When data is received as an input from a tape recorded in a multi-file according to the prior art, a command for searching tape marks as the division of the files is sequentially generated and the search is made as to whether the files are an object file. When this system is applied to the management of virtual volumes on the magnetic tape, the existence of the virtual volumes on the magnetic tape can be confirmed only by rewinding the tape to the start and then searching the virtual volumes on the tape. Since the command for searching the tape marks has a steady tape travelling speed, it is time-consuming, so that the load of the host device increases due to the confirmation processing of the virtual volumes, and processing performance of the system is adversely affected.

On the other hand, a high speed location command using physical block iD representing physical positions on the tape is known, but position data of each volume must be sent from the central processing unit because the position data of each volume is not recorded on the tape.

In the prior art, when the data are provided as an output to the tape, the data can be written only sequentially to the tape from the leading part of the tape because the data are not divided by a predetermined size. Therefore, when a virtual volume or volumes are added to the tape having a plurality of virtual volumes such as in the magnetic tape, the additional volume or volumes can be written only after the virtual volume at the rearmost portion on the tape. When the virtual volume or volumes are deleted, a processing for sequentially rewriting the virtual volumes on the tape becomes necessary, and the load to the host device increases.

The present invention solves these problems and accomplishes the objects described above.

To accomplish the objects described above, the present invention provides a magnetic tape control apparatus for a cassette type magnetic tape which can store apparently the sum of the capacities of a plurality of magnetic tapes or magnetic disks as viewed from a central processing unit, which does not require rewinding of the tape to the other tape reel at the time of demounting of the tape from the apparatus, and which includes recording means for recording the apparent capacity of one magnetic tape as one recording unit (virtual volume) or the apparent capacity of one magnetic disk as one recording unit (virtual volume), whereby the recording means records control data pertaining to the identification of the virtual volumes into control data regions existing in front and at the back of the virtual volume.

When the recorded magnetic tape is used for an input/output processing, the written identification data of the virtual volume is read out from the tape when the tape is mounted, so that the position and existence of the virtual volume, for which the mount request is generated from the central processing unit, can be known, and the locating operation to the virtual volume can be made automatically and at a high speed by the magnetic tape control apparatus alone without applying any load to the central processing unit.

According to the present invention as described above, high speed locating to the virtual volume on the tape, for which the mount request is generated, on the tape can be carried out without applying any load to the central processing unit, and the management and processing of the magnetic tape, as viewed from the central processing unit, can be made without changing the management and processing of the conventional magnetic tapes.

The foregoing explains about the case where the virtual volume is recorded as a unit with the control data. Next, a processing for dividing the data recorded by the use of the virtual volume as a unit and processing the divided data by a plurality of logical devices will be explained.

The data buffer division technique disclosed in JP-A-57-152028 is the system which temporarily stores the data on the data buffer when the data sent from the host device is written to the tape, and executes write of the data to the tape when a predetermined time passes or when the data buffer is full of the data, or stores the data on the tape until the data buffer becomes full, and transfers the data when the data on the tape is transferred to the host device. It has been found out that when this system is applied to the large capacity magnetic tape, the following problems occur.

In accordance with the system disclosed in JP-A-57-152028 described above, a data buffer having a capacity by far smaller than the capacity of one conventional magnetic tape is used. Therefore, if this system uses a large capacity magnetic tape capable of storing the sum of the capacities of a plurality of conventional (ordinary type) magnetic tapes and if this system is applied to a magnetic tape apparatus (multi-volume magnetic tape apparatus) using a recording system which divides logically the large capacity magnetic tape by the capacity of one conventional magnetic tape so as to form virtual volumes, and lets each of the virtual volumes to correspond equivalently to the volume of one conventional (ordinary type) magnetic tape, the processing for executing a write/read processing that can be executed for the different virtual volumes on this large capacity magnetic tape is only the sequential processing which executes the processing of one of the virtual volumes and then execute the processing of the other volume region after the former is completed. Therefore, if the processings concentrate at one time (simultaneously) on a plurality of virtual volumes on the magnetic tape, the wait time of processing increases and system performance is affected adversely.

According to the technique of JP-A-57-152028 described above, only the data of a part of the virtual volume is stored on the data buffer. Therefore, when the virtual volume on the magnetic tape is copied to another virtual volume, positioning to the virtual volume as the origin of copying and to the virtual volume as the destination must be repeated many times, so that the processing time becomes longer than in the conventional tape copying operation and system performance becomes lower.

The term "mount/demount" (which will sometimes be referred to also as "load/unload") means the fitting/removing operation of the magnetic tape to and from a magnetic tape driving unit (physical device), and means also the transfer of data (mount) from the magnetic tape (the magnetic tape driving unit) to the data buffer in the virtual volume unit or the transfer of data (demount) from the data buffer to the magnetic tape (the magnetic tape driving unit).

To accomplish the objects already described, the present invention employs a recording system which uses a large capacity magnetic tape capable of storing the sum of the capacities of at least a plurality of conventional type magnetic tapes, divides logically the large capacity magnetic tape into a plurality of virtual volumes by the capacity of one conventional type magnetic tape, and allows each virtual volume to correspond apparently and equivalently to the volume of one conventional type magnetic tape. In a magnetic tape control apparatus including a data buffer for storing temporarily data transferred between a host device and a magnetic tape driving unit, the system of the present invention uses a large capacity buffer as the data buffer as a whole, and includes means for dividing (allotting) the data buffer into a plurality of logical devices by the capacity divided logically as the unit of division. In this case, a plurality of data buffers having a capacity capable of storing the memory contents each being allotted to each logical device may be used in place of the division of one data buffer into a plurality of logical devices.

The logical devices on the data buffer can be expanded to the number of the magnetic tape driving units as the number of the physical devices of the greatest structure to which the magnetic tape control apparatus can be connected.

The present invention employs the structure wherein the data of one volume is read from the virtual volume divided by the capacity of one conventional magnetic tape on the magnetic tape to the logical device on the data buffer at the time of the mount request of the magnetic tape, the write/read processing for this virtual volume is then executed on the logical device, and at the time of the demount request of the magnetic tape, the data of one volume on the logical device is written to the corresponding virtual volume on the magnetic tape.

The present invention employs also the structure wherein coordination between a plurality of logical devices and the magnetic tape driving devices as the physical devices is automatically allotted by the magnetic tape control apparatus.

The magnetic tape control apparatus has, as the management data corresponding to the logical devices, the addresses of the physical devices to which the magnetic tape corresponding to the virtual volume stored in the logical device is mounted, the position data of the virtual volume on the magnetic tape stored in the logical device, the name of the volume and the volume management data.

When any trouble occurs when writing the data to the corresponding virtual volume at the time of demounting of the magnetic tape, this data is written to an empty virtual volume on the magnetic tape, and the virtual volume in which the trouble occurs is nullified.

When updating of the read data on the logical device is not made in the logical device on the data buffer, write of the data to the virtual volume on the magnetic tape corresponding to this logical device is not made.

Each logical device on the data buffer has the function of copying the data on the logical device to another logical device.

Each logical device on the data buffer can sequentially merge the data of its own at the back of the data of another logical device and can write it to one logical device.

Next, the functions based on the structure described above will be explained.

In a magnetic tape apparatus which divides one large capacity magnetic tape into a plurality of virtual volumes (each region corresponding to one conventional type magnetic tape), the apparatus of the present invention uses large capacity data buffers and allows them to correspond to the virtual volumes (each corresponding to one conventional type magnetic tape) and to divide them to a plurality of logical devices. Accordingly, even when the write/read processing request (input-/output processing) is generated from the host device to a plurality of virtual volumes on the magnetic tape, the data of the different virtual volumes can be read from the magnetic tape and can be stored in the different logical devices inside the magnetic tape control apparatus, and in this way, the subsequent input/output request for the data read to a plurality of logical devices can be made on the logical devices, and simultaneous processing for a plurality of logical devices on the data buffer becomes possible. As a result, a substantially simultaneous parallel processing which is not the sequential processing, for a plurality of virtual volumes on the same tape can be made.

As described above in detail, in the magnetic tape control apparatus which uses a large capacity tape capable of storing the sum of the capacities of at least a plurality of conventional type magnetic tape, and uses a recording system which divides logically the large capacity magnetic tape by the capacity of one conventional type magnetic tape to form virtual volumes and allows the virtual volume to apparently correspond to the capacity of one conventional type magnetic tape, the apparatus of the present invention uses a large capacity data buffer and divides the region of this data buffer into a plurality of logical device regions. Accordingly, when a processing for a plurality of virtual volumes on the magnetic tape is executed, the host device can execute a substantially simultaneous parallel processing, which is not a sequential processing, for the virtual volume, and can improve processing efficiency.

BRIEF DESCRIPTION OF THE DRAWINGS

FIGS. 1A and 1B is an explanatory view of a format of a magnetic tape when the present invention is applied;

FIG. 3 is a structural view of a table used in a microprocessor;

FIG. 4 is a structural view of a table used in a microprocessor;

FIG. 13 is a structural view of a physical device management data table used in the microprocessor;

FIG. 18 is a flowchart of a processing in a magnetic tape control apparatus using the present Invention.

DETAILED DESCRIPTION OF THE PREFERRED EMBODIMENTS

Hereinafter, a magnetic tape control apparatus according to the present invention will be described with reference to the accompanying drawings.

Figure 2:
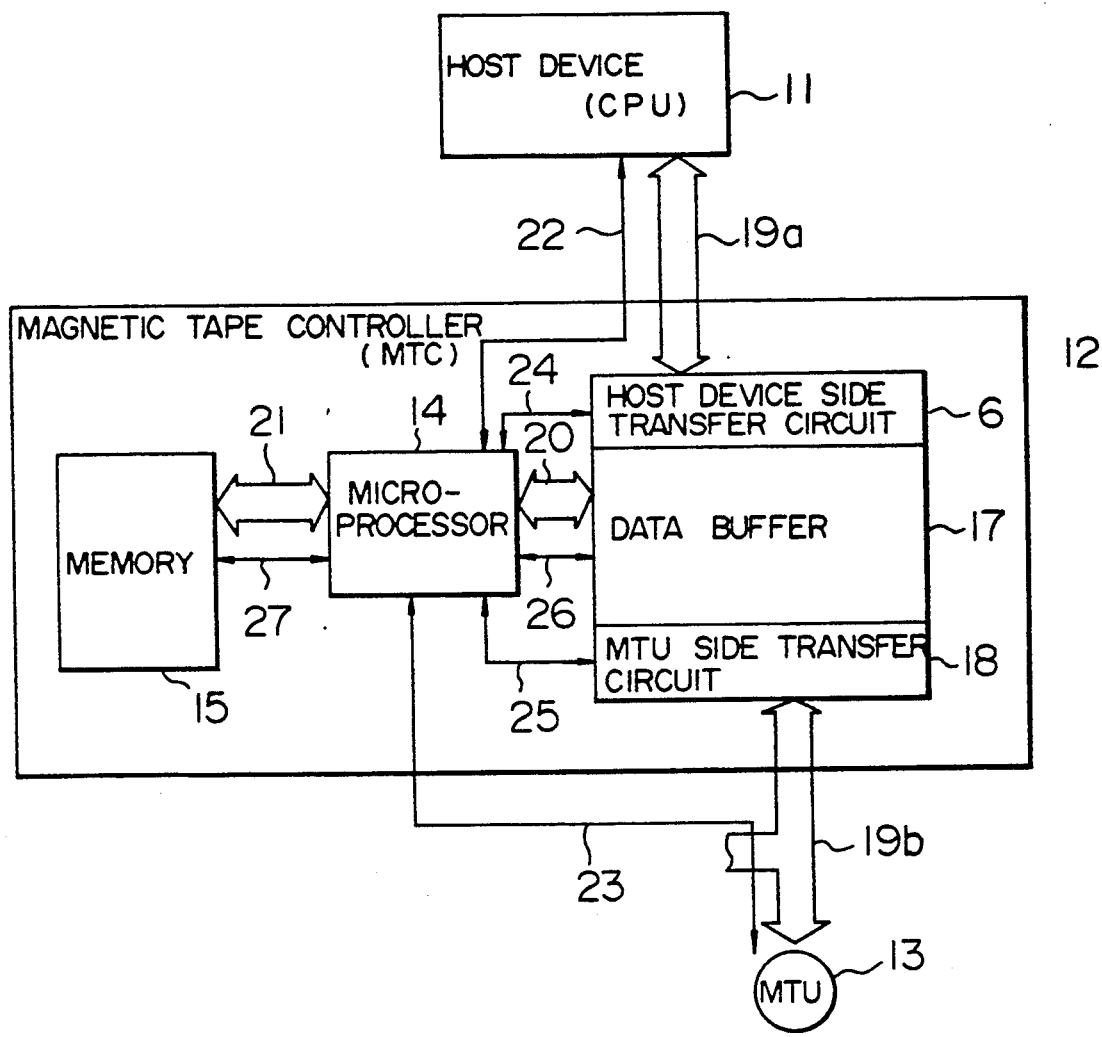
FIG. 2 is a block diagram of a computer system including a magnetic tape control apparatus according to the present invention.
Figure 5:
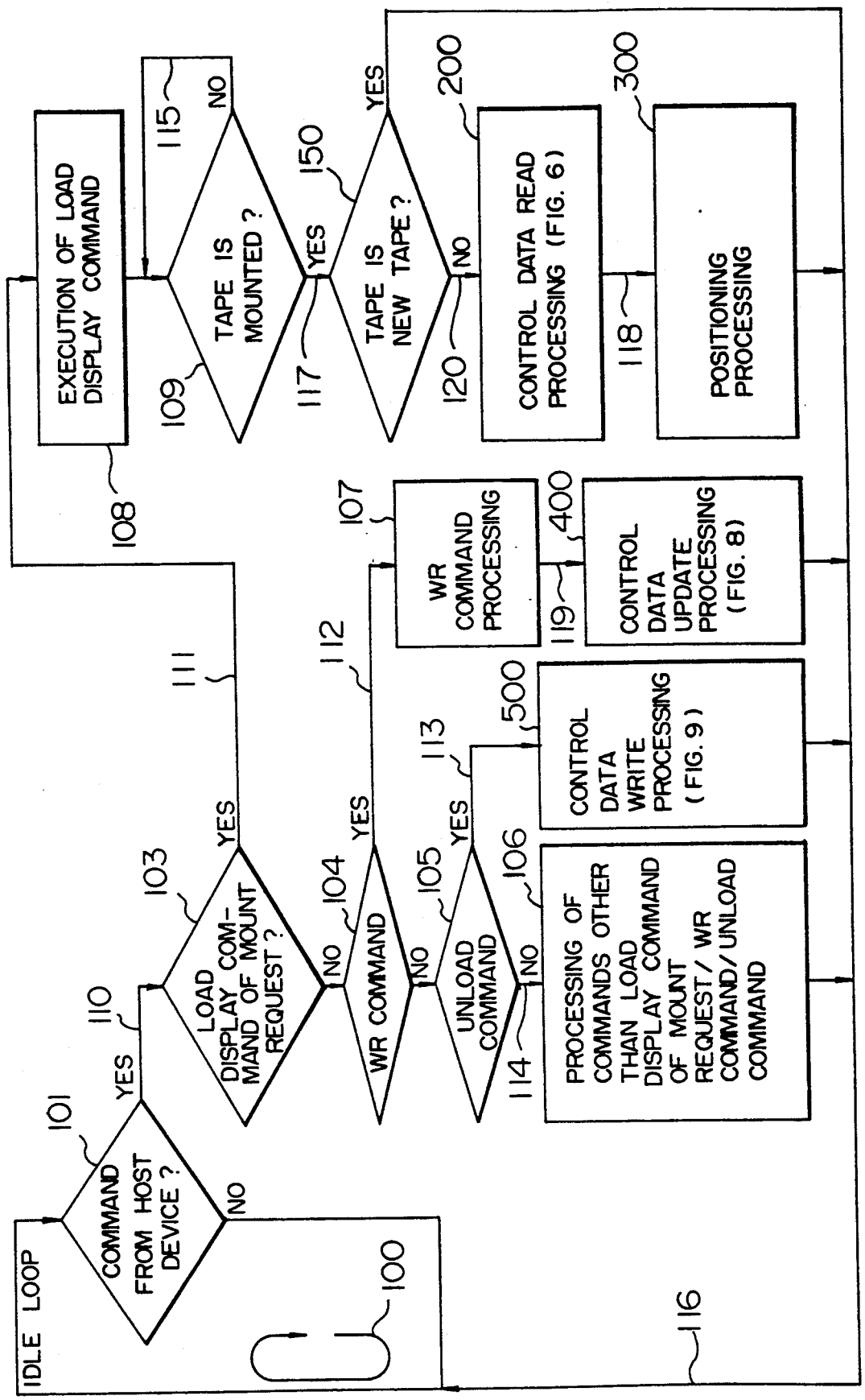
FIG. 5 is a flowchart of a processing in a magnetic tape control apparatus using the present invention.

FIGS. 1A and 1B show an example of a magnetic tape format used in the magnetic tape control apparatus according to the present invention, FIG. 2 is a system structural view for accomplishing this embodiment, FIG. 3 shows a control table managed by a microprocessor of a magnetic tape control apparatus, and FIG. 4 shows an erase number counter table 10 which the microprocessor 14 has on a memory 15 as control data. FIGS. 5 to 9 show a flowchart related to processing in the microprocessor.

To begin with, the outline of the present invention will be given prior to the definite explanation, with reference to FIGS. 1A and 1B.

The tape format shown in FIG. 1A represents an example of a format of regions when a tape is divided into a control data region and a data region according to the present invention. The tape format shown in FIG. 1B represents a format of data written onto the tape when the present invention is applied.

The present invention secures regions by dividing the tape 1 into virtual volumes 3a to 3e each corresponding to the capacity of one conventional magnetic tape or one conventional magnetic disk, and secures control data regions 2a-2e between the virtual volumes 3a-3e. Before a mount operation, which is carried out at the time of completion of a write operation of data into the virtual volumes 3a-3e, is executed, the tape is allowed to travel to the division of the virtual volume, control data 4a, 4b such as VOL (virtual volume name) 6 written into the data region of the tape and positioning data of the virtual volumes 3a-3e allotted to the region capable of storing the capacity of one conventional magnetic tape or that of one conventional magnetic disk and specific format data 5 for confirming a demount position representing a demount position are written into the control data region.

Next, an embodiment of the present invention will be explained in detail with reference to FIGS. 2 to 9.

FIG. 2 shows an example of the system configuration in this embodiment, and the system comprises a host device (central processing unit, CPU 11), and a magnetic tape control apparatus (hereinafter referred to as "MTC") 12 and a plurality of magnetic tape driving units (hereinafter referred to as "MTU") 13 that are connected to the CPU 11.

The CPU 11 and the MTC 12 are connected by a control line 22 and a data line 19a so that data transfers can be made from the CPU 11 to the MTC 12 and vice versa. Furthermore, the MTC 12 and the MTUs 13 are connected to one another by a control line 23 and a data line 19b so that data transfers can be made from the MTC 12 to the MTUs 13 and vice vera, and the operation of the MTU can be controlled.

The MTC 12 in turn comprises a transfer circuit 16 on the host device side for controlling the data transfer with the CPU 11, an MTU side transfer circuit 18 for controlling the data transfer with the MTUs 13, a data buffer 17 for temporarily storing data to be inputted and outputted, a memory 15 for storing a program and control data read out from the tape, and a microprocessor 14 as control means for controlling the MTU 12 in accordance with the program stored in the memory 15. The microprocessor 14 and the MTU side transfer circuit 18 together constitute recording means.

The microprocessor 14 is connected to each of the CPU 11, MTU 12, host device side transfer circuit 16, MTU side transfer circuit 18, data buffer 17 and memory 15 by control lines 22 to 27 and can control them. Furthermore, the microprocessor 14 is connected to the data buffer 17 and to the memory 15 by the data lines 20, 21, and the host device side transfer circuit 16 is connected to the CPU 11 by the data line 19a. The MTU side transfer circuit 18 is connected to the MTU 13 by the data line 19b. The data transfer between the CPU 11 and the data buffer 17 is made by designating the control data for the data transfer from the microprocessor 14 to the host device side transfer circuit 16 through the control line 24. As the control data for the data transfer, data of a transfer direction, the address of the transfer data on the data buffer 17, and the start and end designation data of the data transfer are exchanged. The data transfer between the data buffer 17 and the MTU 13 is made by designating the control data for the data transfer from the microprocessor 14 to the MTU side transfer circuit 18 through the control line 25. The control data designated to the MTU side transfer circuit 18 include a recording format, a transfer direction, the address of the transfer data on the data buffer 17, positioning data, and so forth.

The microprocessor 14 can access the data buffer 17 through the data line 20 and the control line 26, can read the control data read out from the tape. It can write the data into the memory 15 through the data line 21 and the control line 27. It can also read the control data stored in the memory 15 through the data line 21 and the control line 27, and can write the data into the data buffer 17 through the data line 20 and the control line 26.

Furthermore, the microprocessor 14 can access a control table and a management table stored in the memory 15 through the control line 27 and the data line 21.

FIG. 3 shows a control data table for use by the microprocessor 14 to manage the control data on the tape. This table is stored in the memory 15. The control data table 4 manages the data of the virtual volume stored in one tape, and includes a virtual volume identification data 5, a virtual volume positioning data 6, the volume name 7 of the virtual volume, data management data, etc. Data updating is effected at the time of write of the volume name of the virtual volume and at the time of write of the data, and the data is written as the control data to the tape at the time of demounting of the tape.

FIG. 4 shows an erase number counter 10 which the microprocessor 14 has on the memory, for controlling data. The erase number counter 10 is used for counting the number of times of erase of the control data when any trouble occurs during the write operation of the control data to the tape.

FIGS. 5 to 9 show the flow of microprocessor processing. Under the state where no processing request exists, processing turns round an idle loop 100. When a command (processing request) from the CPU 11 is detected at step 101, the operation branches through a route 110 and then through each of the routes 111, 112, 113, 114 depending on whether the command is a message display command for requesting to mount the tape (hereinafter referred to as a "load display command"), or a data write command (hereinafter referred to as a "WR command"), or a command for requesting to demount the tape (hereinafter referred to as an "unload command") or other commands, respectively, and proceeds to each of the steps 108, 107, 500 and 106.

In the step 108, a display command is designated to the MTU 13 through the control line 23 and the data line 19b so as to display the volume name of the virtual volume mounting of which is requested, and the flow proceeds to the processing step 109 after the load display command is executed.

Processing step 109 judges whether or not the tape is mounted to this MTU 13, and if the tape is mounted, the flow proceeds to the processing step 150 through the route 117. If the tape is not mounted, the flow enters the loop through the route 115 until the tape is mounted.

Processing step 150 judges whether or not the mounted tape is a new blank tape is judged, and if it is such a new tape, the flow returns to the idle loop through the route 116. If the tape is not a new tape, the flow proceeds to the processing step 200 through the route 120.

Figure 6:
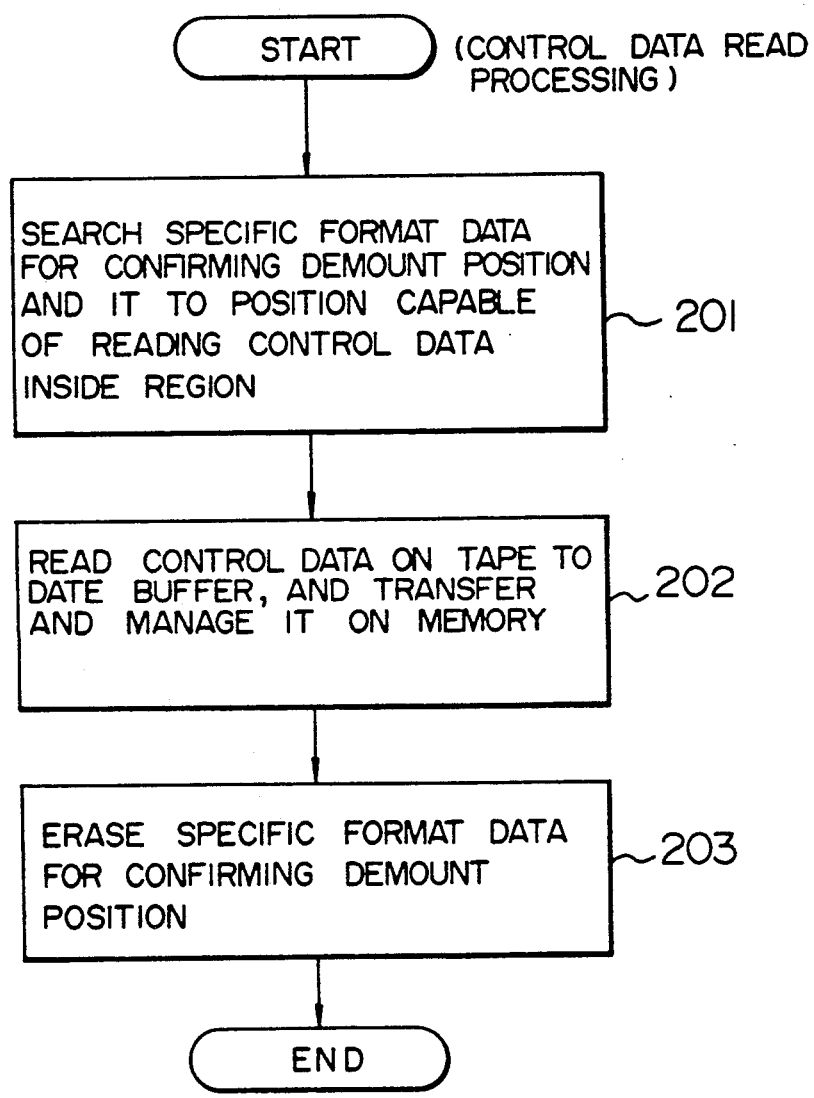
FIG. 6 is a flowchart of a processing in a magnetic tape control apparatus using the present invention.

In the processing 200, read processing of the control data on the tape written when the tape is demounted is executed in accordance with a processing operation shown in FIG. 6, and then the flow proceeds to the processing step 300 through the route 118. Processing step 300 carries out positioning processing of the mount request designated by the load display command to the virtual volume. After this processing is completed, the flow returns to the idle loop 100 through the route 116. Processing step 107 carries out a data write to the tape (WR command processing) and after this processing is completed, the flow proceeds to the processing step 400 through the route 119. Processing step 400 carries out updating and addition processing of the control data is carried out in accordance with the processing flow shown in FIG. 8, and then the flow returns to the idle loop 100 through the route 116.

Figure 9:
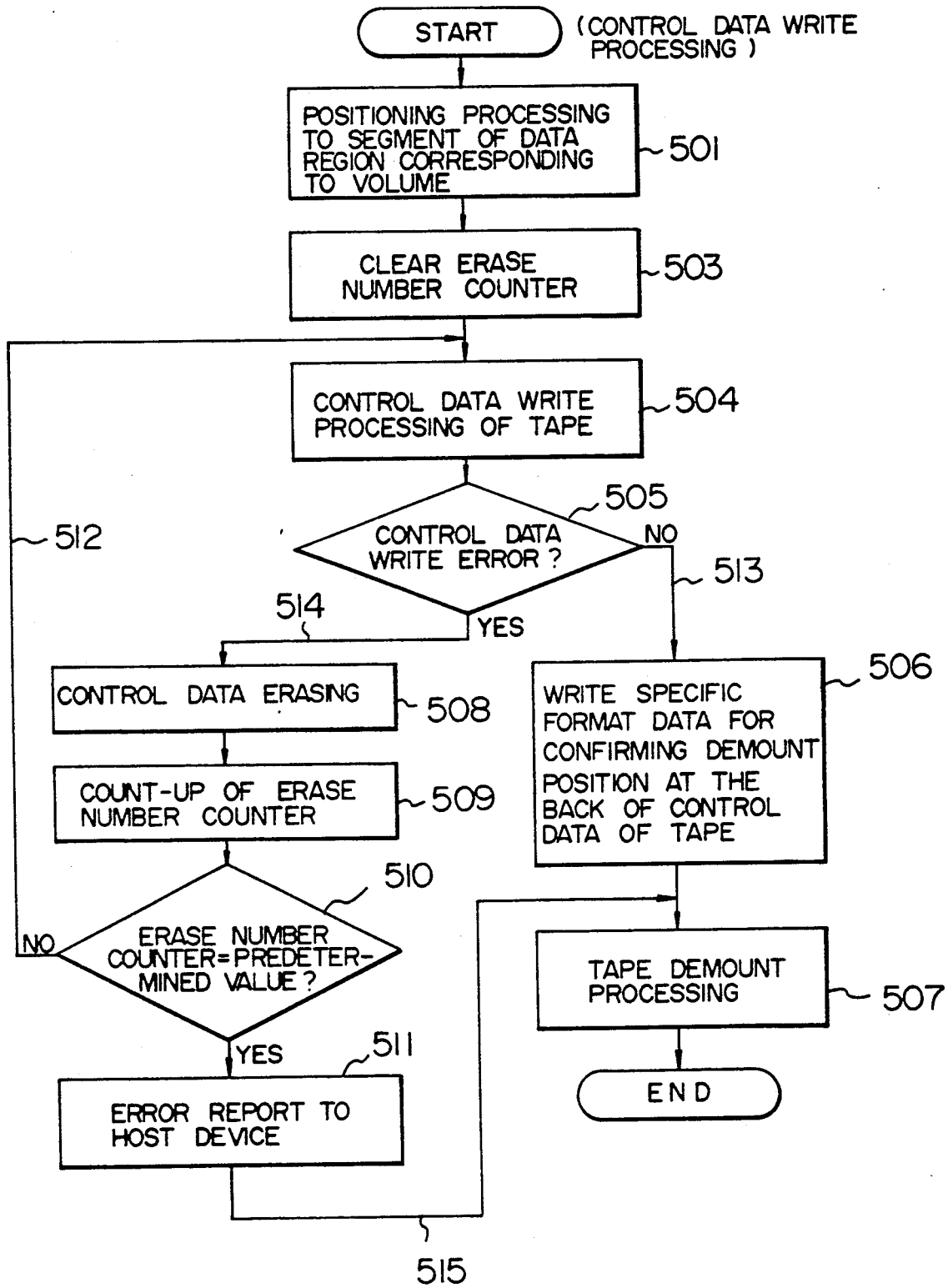
FIG. 9 is a flowchart of a processing in a magnetic tape control apparatus using the present invention.

In the processing step 500, the tape position is moved to the division point of the virtual volume in accordance with the processing flow shown in FIG. 9, and the control data is written into the control data region existing at the position of the division point of the virtual volume. After the specific format data for confirming the demount position is written at the back of this division point, the tape demount processing is carried out. After this processing is completed, the flow returns to the idle loop 100 through the route 116.

In the processing step 106, command processings other than the load display command/WR command/unload command of the mount request from the CPU 11 are carried out, and then the flow returns to the idle loop 100 through the route 116.

FIG. 6 shows a flowchart of the processing for reading the control data written when the tape is demounted, from the tape. In the processing step 201, the MTU 13 is activated through the control line 23 and the data line 19b, and the MTU side transfer circuit 18 is controlled through the control line 25 so as to search out the specific format data for confirming the demount position. After positioning is made to a position, at which the control data inside the control data region in which the specific format is written can be read out, the flow proceeds to the processing step 202. In this processing step 202, the control data written on the tape are read out and read into the data buffer 17, and the data are transferred to, and managed by, the memory 15 through the control lines 26, 27 and the data lines 20, 21. Next, the flow proceeds to the processing step 203, where an erase processing of the specific format for confirming the demount position, which is written in the control data region, is carried out, and the procedure is thus completed.

Figure 7:
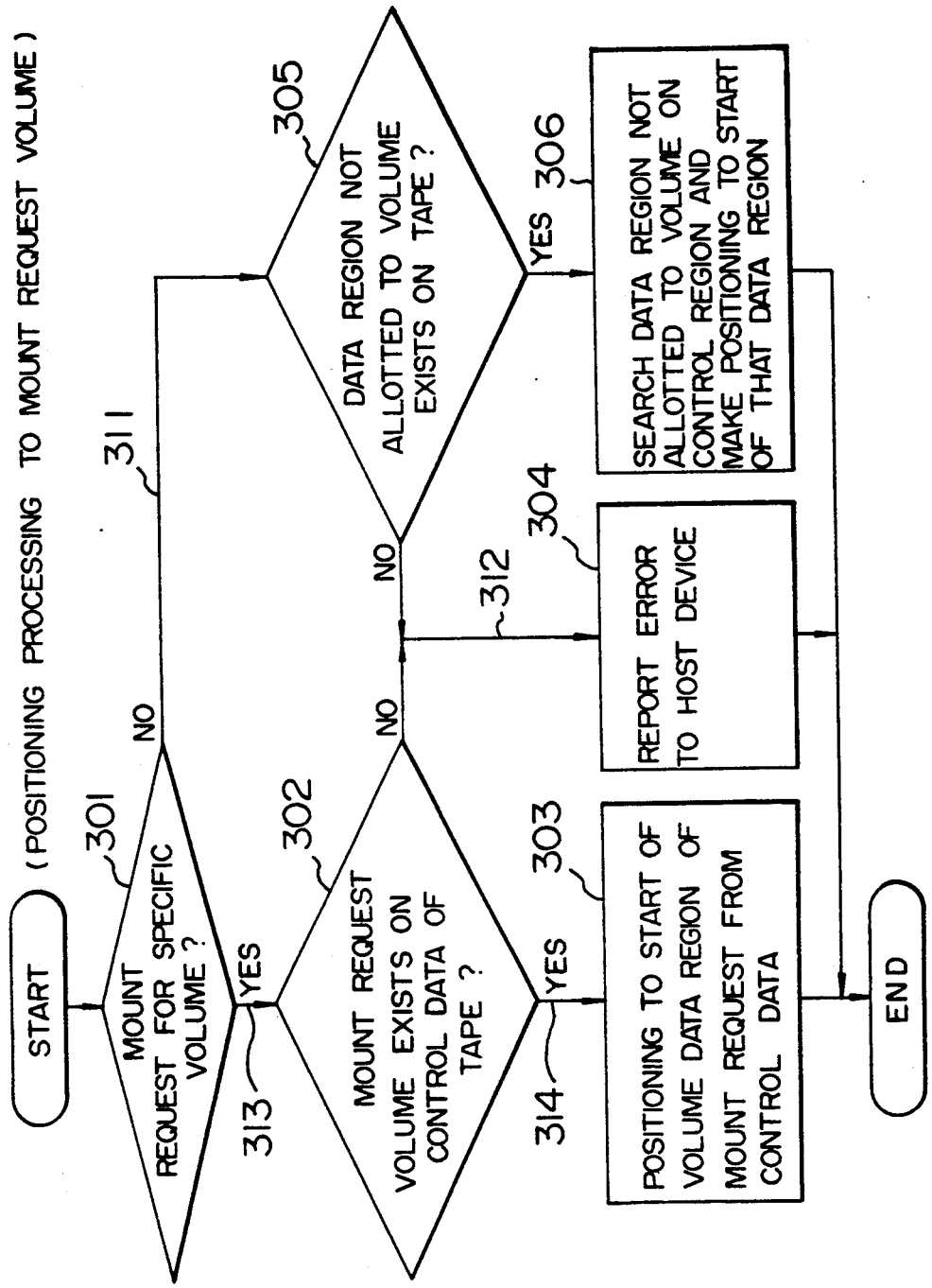
FIG. 7 is a flowchart of a processing in a magnetic tape control apparatus using the present invention.

FIG. 7 shows the flow of a positioning processing to a virtual volume, mounting of which is requested, when the mount request load display command is generated.

Processing step 301 judges whether the virtual volume requested by the mount request load display command is a mount request of a specific virtual volume, and if it is not the mount request of the specific virtual volume, the flow proceeds to the processing step 305 through the route 311.

If it is the mount request of the specific virtual volume, the flow proceeds to step 302 through the route 313. This processing step 302 searches whether or not the virtual volume of the mount request exists in the volume name 7 of the virtual volume on the management table 4 of the control data in the memory 15 read from the tape. If the virtual volume of the mount request exists, the flow proceeds to the processing 303 through the route 314.

If the virtual volume of the mount request does not exist, the flow proceeds to the processing step 304 through the route 312. In the processing 304, the absence of the virtual volume of the mount request is reported (error report) to the CPU 11 through the control line 22 and the data line 19a, and the procedures are thus completed.

In the processing step 303, the positioning data of the virtual volume corresponding to the virtual volume of the mount request are acquired from the management table 4 of the control data managed on the memory 105, and the positioning position is instructed to the MTU 13 through the control line 23 and the data line 19b, and the MTU 13 are actuated. Then, the positioning data is indicated to the MTU side transfer circuit 18 through the control line 25, and the positioning processing is made to the leading part of the virtual volume as the object of the mount request. The procedures are thus completed.

Processing step 305 judges whether or not the region in which the volume of the virtual volume can be used (the non-volume tape of a conventional magnetic tape or the state where no data is written) exists in the control data table 4 as the control data of the tape managed on the memory 15, and if it does not exist, the flow proceeds to the processing step 304 through the route 312 and the processing step 304 for reporting the error to the CPU 11 is executed.

If the region where the volume of the virtual volume can be used exists, the flow proceeds to the processing step 306. In this processing step 306, in order to make positioning to the usable region from the control data table 4 of the tape managed on the memory 15, the positioning data obtained from the virtual volume positioning data 6 of the virtual volume on the control table 4 is designated to the MTU 13 through the control line 23 and the data line 19b and after the MTU 13 is thus activated, the data is designated to the MTU side transfer circuit 18 through the control line 25. After positioning is thus made before the usable region of the virtual volume, the processing is completed.

Figure 8:
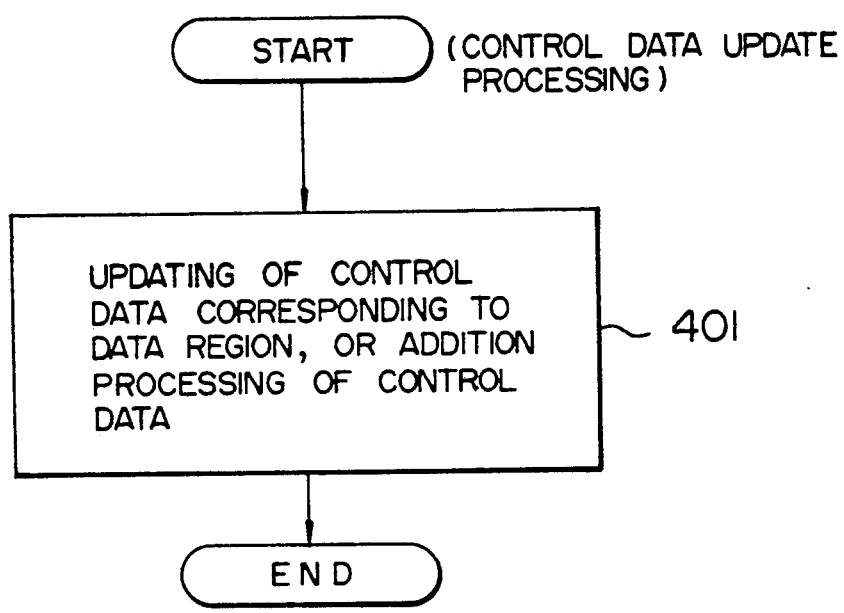
FIG. 8 is a flowchart of a processing in a magnetic tape control apparatus using the present invention.

FIG. 8 shows an updating and addition processing flow of the control data after data write. In the processing step 401, if the data write processing is a volume re-write processing or a volume addition processing in the control data table 4 of the tape managed on the memory 15, the updating or addition processing of the virtual volume identification data 5, the virtual volume positioning data 6, the volume name 7 of the virtual volume and the data management data 8 corresponding to this virtual volume are carried out. If the data write processing is a write processing of the data block, the updating or addition processing of the data management data 8 corresponding to this virtual volume is carried out.

FIG. 9 shows the processing flow for writing the control data for the tape onto the tape when the unload command is generated from the host device 11.

In the processing step 501, the MTU 13 is activated through the control line 23 and the data line 19b to make positioning to the division point of the virtual volume when the unload command is received from the host device 11, and the designation is given to the MTU side transfer circuit 18 through the control line 25. After the division of this virtual volume is searched, the flow proceeds to the processing step 503.

In the processing step 503, the erase number counter 10 of the MTU 13 managed on the memory 15 is cleared to zero. Then, the flow proceeds to the processing step 504. The control data managed on the memory 15 and corresponding to the tape is written into the data buffer 17 through the control lines 26, 27 and the data lines 20, 21, the MTU 13 is activated through the control line 23 and the data line 19b, and the data transfer to the MTU 13 is designated to the MTU side transfer circuit 18 through the control line 25, so that the control data of the tape is written to the control data region on the tape.

Next, the flow proceeds to the processing step 505, where judgement is made as to whether or not any trouble for writing occurs at the time of write of this control data. If trouble for writing the control data occurs, the flow proceeds to the processing step 508 through a route 514. If the problem does not occur, the flow proceeds to the processing 506 through the route 513.

In the processing 508, when any trouble occurs for writing the control data, the MTU 13 is activated through the control line 23 and the data line 19b, and an erase instruction for erasing the control data on the tape is sent to the MTU side transfer circuit 18 through the control line 25 so as to erase this control data. Thereafter, the flow proceeds to the processing step 509, where the erase number counter 10 of this MTU 13 managed on the memory 15 is counted up through the control line 27 and the data line 21. Then, the flow proceeds to the processing step 501 which judges the arrival at a stipulated value by judging as to whether or not the control data can be written to the control region on the tape.

When the erase number counter 10 does not reach the stipulated value in the processing step 510, the flow returns to the processing step 504 through the route 512. When the erase number counter 10 reaches the stipulated value, the flow proceeds to the processing 511, at which the occurrence of the control data write hindrance is reported to the host device 11 through the control line 22 and the data line 19b, and the flow proceeds to the processing 507 through the route 515.

In the processing step 506, the MTU 13 is activated through the control line 23 and the data line 19b at the back of the control data written to the tape, and write of the specific format for confirming the demount position to the tape is instructed to the MTU side transfer circuit 18 through the control line 25 and in this way, the specific format for confirming the demount position is written to the tape. Then, the flow proceeds to the processing step 507. In the processing step 507, the demount instruction for demounting the tape from the MTU is executed, and the processing is completed.

Though this embodiment represents an example where the control data is managed by the memory 15 inside the MTC 12, it is also possible to employ a method which manages the control data by the data buffer 17 inside the MTC 12.

In this way, according to the present invention, data in the capacity of a plurality of conventional magnetic tapes or a plurality of disk volumes can be stored in one magnetic tape or in one disk volume and in a cassette type magnetic tape which does not require rewinding to one side of a tape reel when the tape is demounted, the host device can handle the magnetic tape without changing the processing to, the conventional magnetic tape.

Figure 10A:
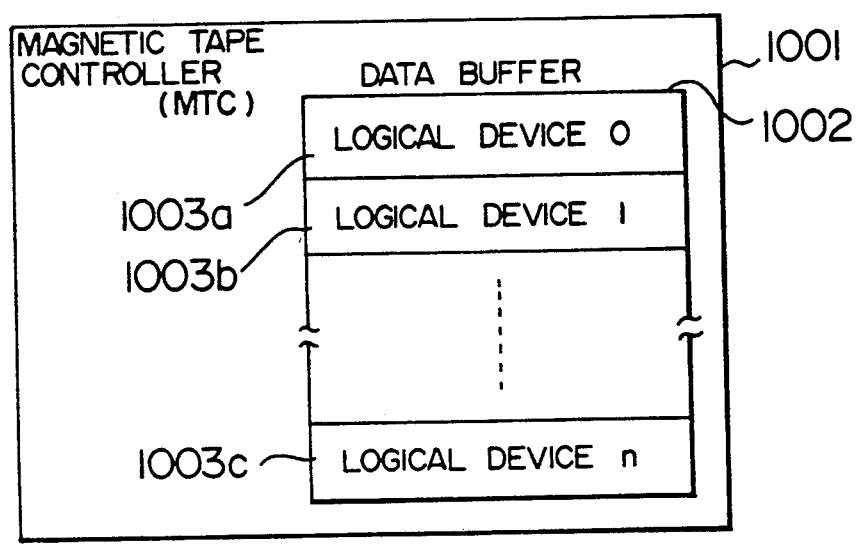
FIG. 10A is a schematic view showing an example of a data buffer when the present invention is applied.
Figure 10B:
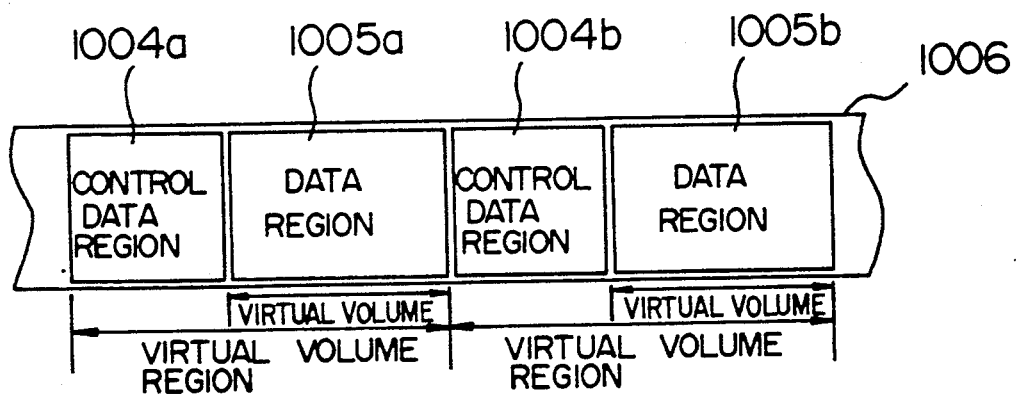
FIG. 10B is an explanatory view showing an example of a magnetic tape recording medium format.

Next, the second embodiment of the present invention will be explained with reference to the drawings. First of all, the outline of the invention will be explained with reference to FIGS. 10A and 10B prior to the definite description. The structure of a data buffer inside a magnetic tape control apparatus shown in FIG. 10A represents an example of the data buffer structure when it is divided into each logic address by the application of the present invention. The magnetic tape format shown in FIG. 10B represents an example of the tape format on the magnetic tape used when the present invention is applied.

The present invention divides the data buffer 2 inside the magnetic tape control apparatus (hereinafter referred to as "MTC") 1001 into a plurality of regions (logical devices) using the capacity of the conventional magnetic tape 1006 as a unit, stores the data of each region divided logically by the capacity of one conventional magnetic tape on the magnetic tape 1006 (virtual volume) when the mount request for the volume is generated by the host device, and effects subsequent write and read of the data from the host device in the logical device on the data buffer. When the host device generates the demount request for the tape storing this volume, the data on the logic device is written into the virtual volume on the tape and then the tape is demounted. Furthermore, in this embodiment, the volume name of the virtual volumes stored in one tape, the positioning data of the virtual volumes and the data management data on the volume are written into the control data region inside the virtual volumes on the tape, and when the mount request of the tape is generated, the volume can be retrieved by this control data, and positioning to the target virtual volume can be made by the positioning data.

Figure 11:
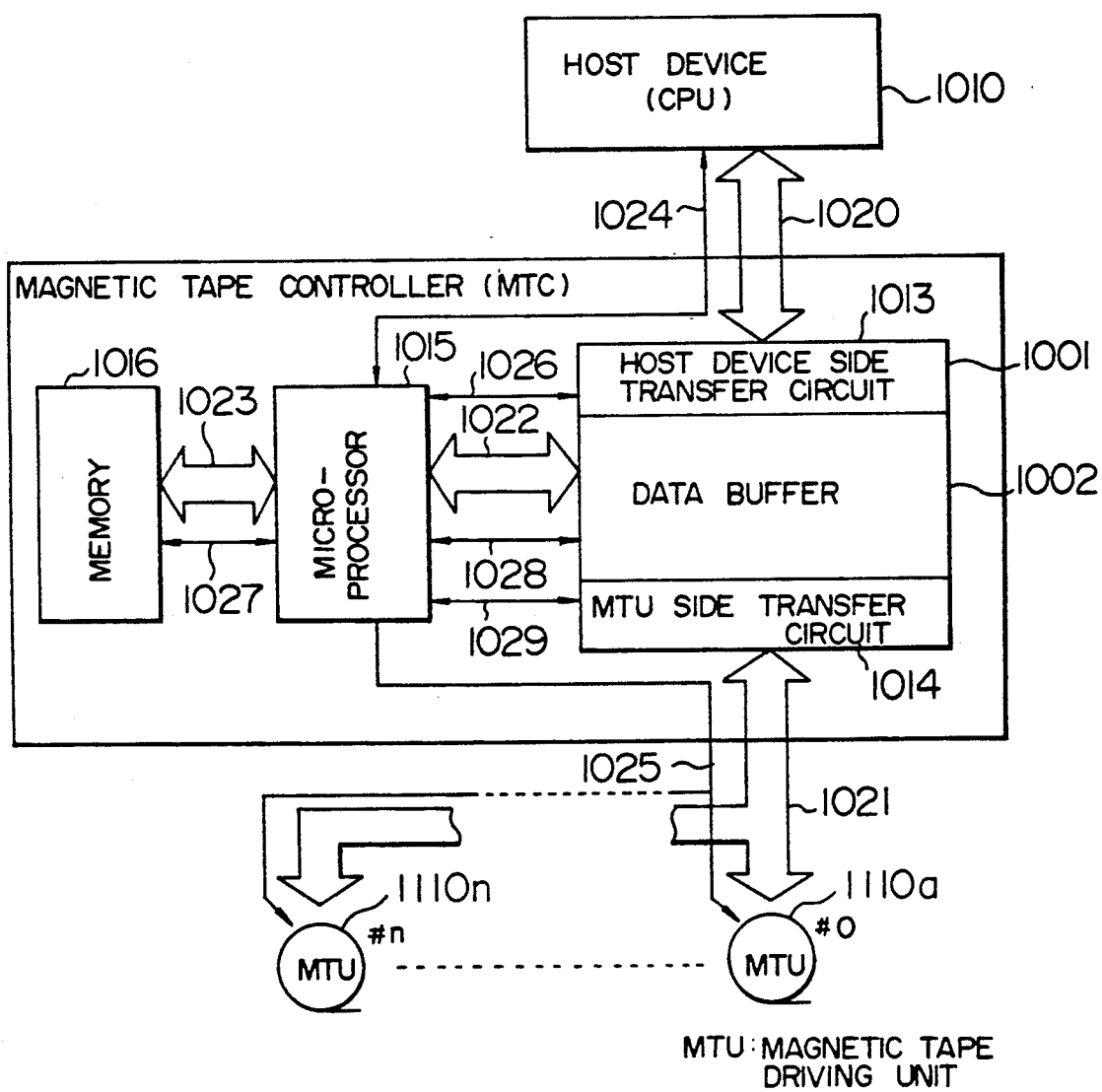
FIG. 11 is an explanatory view showing an example of a logic block of the magnetic tape control apparatus according to the present invention.

Next, the embodiment will be described in further detail with reference to FIGS. 11 to 18. FIG. 11 shows an example of the system configuration according to this embodiment, and the system comprises the host device (CPU) 1010, the magnetic tape control apparatus (MTC) 1001 connected to the CPU, and a plurality of magnetic tape driving units (physical devices or MTU) 1110a-1110n.

The CPU 1010 and the MTC 1001 are connected to each other by the control line 1024 and the data line 1020 so that the data transfer can be made from the CPU 1010 to the MTC 1001 and vice versa. Further, the MTC 1001 and the MTUs 1110a-1110n are connected to one another by the control line 1025 and the data line 1021 so that the data transfer from the MTC 1001 to the MTUs 1110a-1110n and the control of the MTU operation can be made.

The MTC 1001 comprises the host device side transfer circuit 1013 for controlling the data transfer with the CPU 1010, the MTU side transfer circuit 1014 for controlling the data transfer with the MTUs 1110a-1110n, the data buffer 1002 for storing the data of the virtual volume regions on the tape in the present invention and for executing the input/output operations, the memory 1016 for storing the program, the table and the data read from the tape, and the microprocessor 1015 for controlling the MTC 1001 in accordance with the program stored in the memory 1016. The microprocessor 1015 is connected to each of the CPU 1010, the MTUs 1110a-1110n, the host device side transfer circuit 1013, the memory 1016, the data buffer 1002 and the MTU side transfer circuit 1014 through the control lines 1024-1029, respectively, and the control can be made. Furthermore, the microprocessor 1015 is connected to the data buffer 1002 and to the memory 1016 through the data lines 1022, 1023, respectively, and the host side transfer circuit 1013 is connected to the CPU by the data line 1020. The MTU side transfer circuit 1014 is connected to the MTUs 1110a-1110n by the data line 1021. The data transfer between the CPU 1010 and the data buffer 1002 is effected by designating the control data for the data transfer to the host device side transfer circuit 1013 from the microprocessor 1015 through the control line 1026. As the control data for the data transfer are exchanged the transfer direction, the address of the transfer data on the data buffer 1002, and the transfer start and end data. The data transfer between the data buffer 1002 and the MTUs 1110a-1110n is effected by designating the control data for the data transfer to the MTU side transfer circuit 1014 from the microprocessor 1015 through the control line 1025. The control data to be designated to the MTU side transfer circuit 1014 include the recording format, the transfer direction, the address of the transfer data on the data buffer 1002, the positioning data, and so forth.

The microprocessor 1015 can access the data buffer 1002 through the data line 1022 and the control line 1028, reads the control data read from the tape and can write it into the memory 1016 through the data line 1023 and the control line 1027. The microprocessor 1015 can also read the control data stored in the memory 1016 through the data line 1023 and the control line 1027, and can write it into the data buffer 1002 through the data line 1022 and the control line 1028.

Furthermore, the microprocessor 1015 controls the operation start and stop of the MTUs 1110a-1110n, the positioning operation indication, the positioning completion report, and so forth, through the control line 1025.

The microprocessor 1015 can access the logical device management table inside the memory 1016, and the physical device (MTU) management table, through the control line 1027 and the data line 1023.

Figure 12:
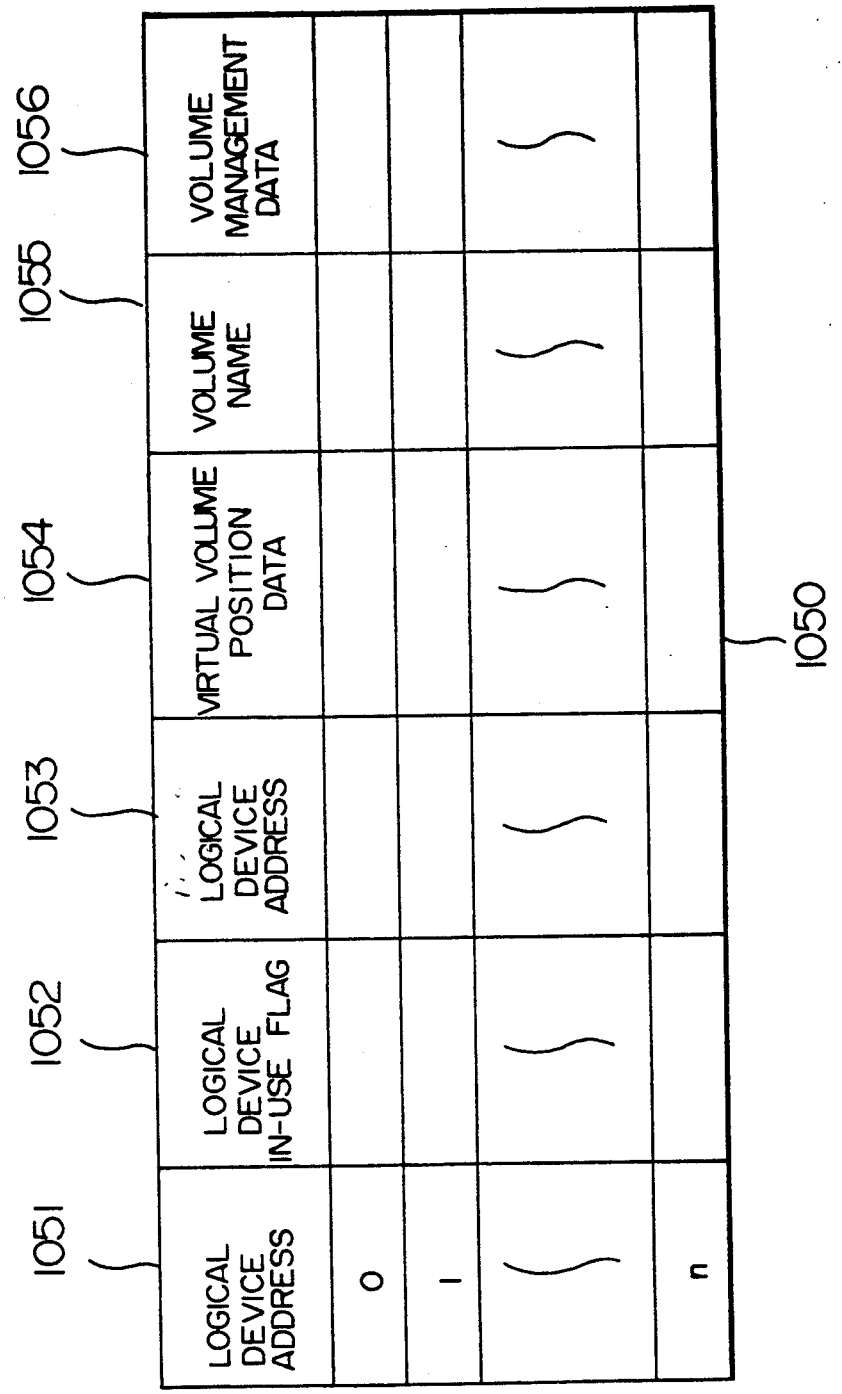
FIG. 12 is a structural view of a logical device management table used in a microprocessor.
Figure 14:
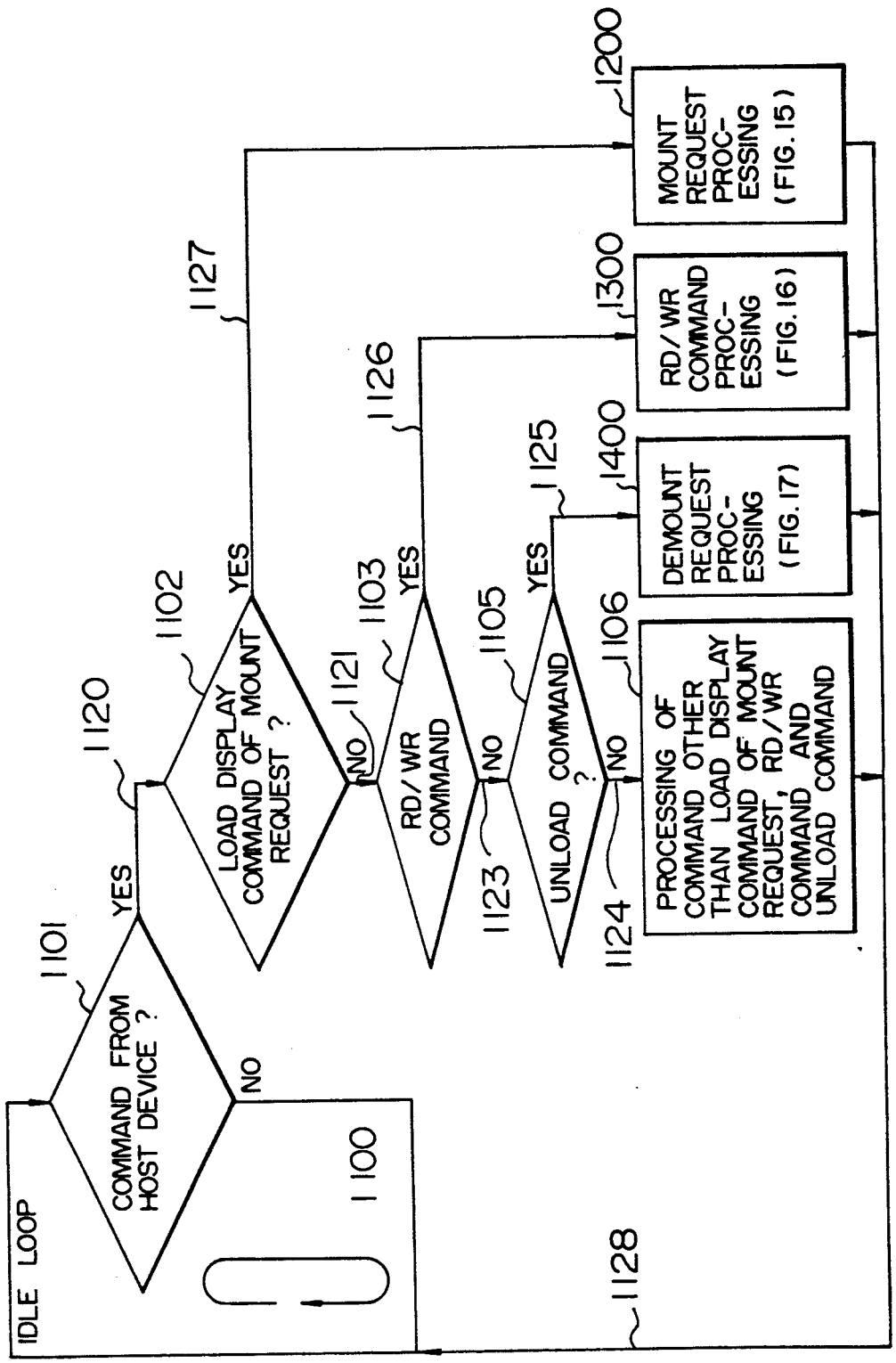
FIG. 14 is a flowchart of a processing in a magnetic tape control apparatus using the present invention.

FIGS. 12 and 13 show examples of the logical device management table 1050 and the physical device management table 1080. FIG. 12 shows the logical device management table 1050 storing the control data of the logical devices on the data buffer which the microprocessor 1015 manages on the memory 1016. The logical device management table 1050 manages the data of the virtual volumes on the tape corresponding to the logical devices of the data buffer. The table includes the logical device address 1051, the logical device in-use flag 1052 which is set when the logical devices 1003a–1003c are in use, the physical device address 1053 storing the addresses of the MTUs 1110a–1110n (physical devices) to which the magnetic tape of the virtual volume corresponding to the logical device 1003a–1003c is mounted, the virtual volume positioning data 1054 in which the position data of the virtual volume on the tape is stored, the volume name 1055 of the virtual volume and the volume management data 1056 of the virtual volume. When the data of the virtual volume on the tape is stored in the logical device on the data buffer 1002 at the time of the mount request of the volume, the data 1055, 1056 are set (taken into the table), and when the data is written from the logical device on the data buffer 1002 into the virtual volume on the tape at the time of the demount request of the volume, resetting (erasing) of the data is effected.

FIG. 13 shows the physical device management data table 1080 which the microprocessor 1015 has on the memory 1016 as the management data. The physical device management data table 1080 stores the "physical device address" 1081, the "physical device in-use flag" 1082 set when this physical device is in use, and the "control data on magnetic tape" 1083 storing a copy of the control data 1004a written into the virtual volume on the tape. The table is set when the magnetic tape is mounted to the physical device and the data of the virtual volume on the tape is read, and is reset when the data is written to the tape at the time of demount of the magnetic tape.

FIGS. 14 to 18 show the processing flow of the microprocessor 1015. Under the state where no processing request exists, the flow turns round the idle loop 1100. When a command (processing request) from the CPU 1010 is detected by the processing step 1101, the flow passes through the route 1120 and proceeds to the processing 1102 for judging whether or not the command is a message display command requesting mount of the tape (hereinafter referred to as the "load display command"). In the processing step 1102, the flow proceeds to the processing step 1200 through the route 1127 if the command is the load display, and proceeds to the processing step 1103 through the route 1121 if the command is not the load display. In the processing step 1200, the tape is mounted to the MTU (physical device) in accordance with the processing flow shown in FIG. 15, and the processing for storing the data into the logical device on the data buffer from the virtual volume. After this processing is completed, the flow returns to the idle loop 1100 through the route 1127.

Processing step 1103 determines whether the command from the host device is a data read command (hereinafter referred to as the "RD command") or a data write command (hereinafter referred to as the "WR command"), and if it is RD or WR command, the flow proceeds to the processing step 1300 through the route 1123. If the command is not the RD/WR command, the flow proceeds to the processing step 1105 through the route 1123. In the processing step 1300, the processing of the RD/WR command in the logical device on the data buffer is effected in accordance with the processing flow shown in FIG. 16, and after the processing is completed, the flow returns to the idle loop 110 through the route 1128.

Processing step 1105 judges whether or not the command is a tape demount command (hereinafter referred to as the "unload command"), and if it is the unload command, the flow proceeds to the processing step 1400 through the route 1125 and if it is not the unload command, the flow proceeds to the processing step 1106 through the route 1124. In the processing step 1400, the processing for writing the data on the logical device on the data buffer 1002 into the virtual volume on the magnetic tape is effected at the time of the demount request of the volume, the demount processing of the tape is then carried out, and after the processing is completed, the flow returns to the idle loop 1100 through the route 1128.

In the processing step 1106, command processings other than the load display command of the mount request from the CPU 1010, the RD/WR command and the unload command are carried out and then the flow returns to the idle loop 1100 through the route 1128.

Figure 15:
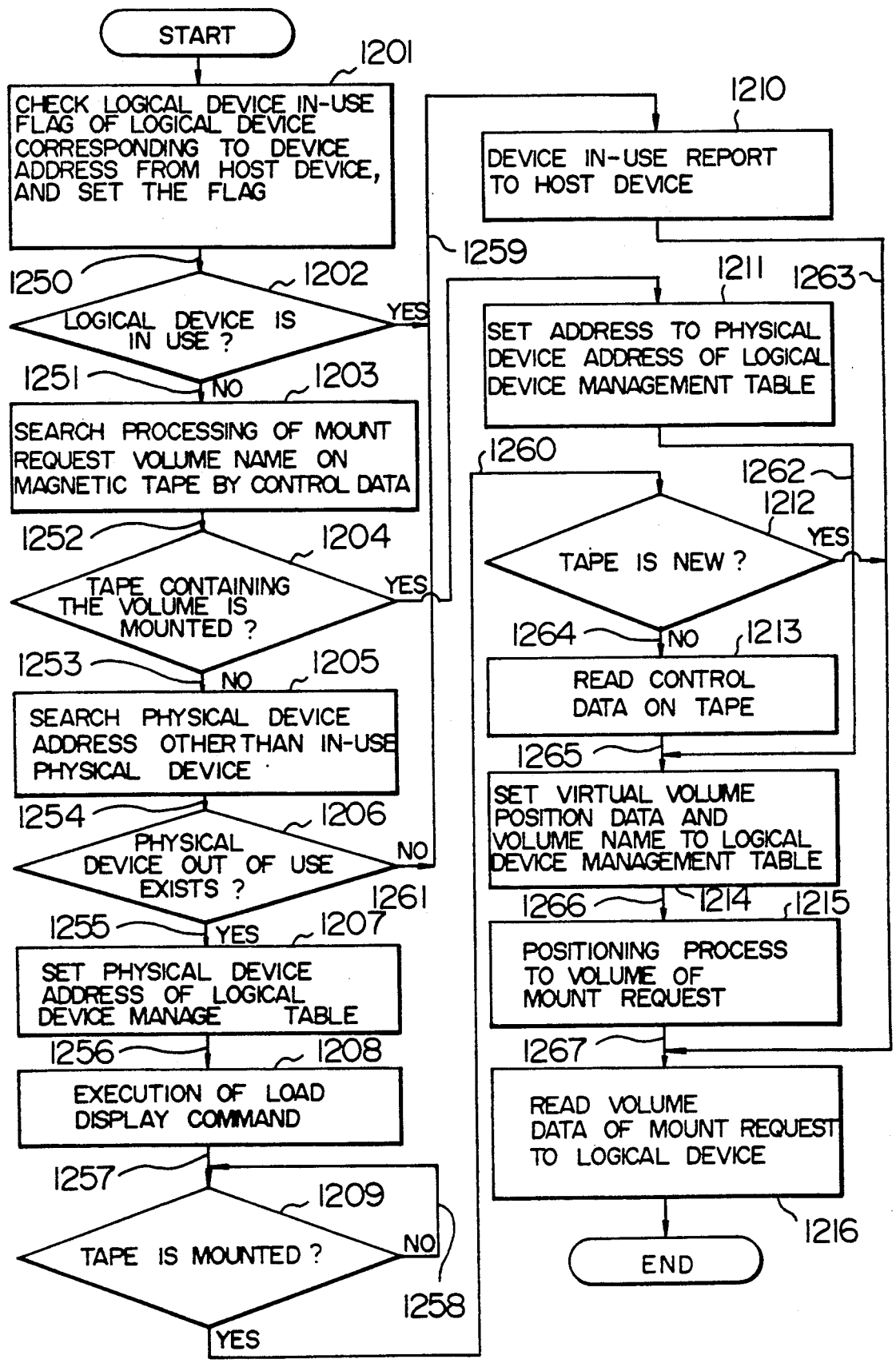
FIG. 15 is a flowchart of a processing in a magnetic tape control apparatus using the present invention.

FIG. 15 shows the processing flow for reading the data onto the logical device on the data buffer 1002 from the virtual volume on the tape when the load display command of the mount request is generated from the CPU 1010. First, the processing step 1201 checks whether or not the logical device corresponding to the device address requested by the CPU 1010 is in use by reading the logical device in-use flag 1052 on the logical device management table 1050 managed on the memory 1016 by the use of the control line 1027 and the data line 1023 and furthermore, in order to represent that this logical device is in use, the flag is set to the logical device in-use flag on the memory 1006 by the use of the control line 1027 and the data line 1023. Next, the flow proceeds to the processing step 1202 through the route 1250 which then judges if the logical device is in use based on the process step 1201. If the logical device is found to be in use; the flow proceeds to the processing step 1210 through the route 1259, and if the logical device is not in use, the flow proceeds to the processing step 1203 through the route 1251.

In the processing step 1203, the control data on the magnetic tape on the physical device management table 1080 on the memory 1016 is read out by the use of the control line 1027 and the data line 1023 to retrieve the volume for which the mount request is generated from the CPU 1010. Then, the processing for checking whether or not the magnetic tape containing this volume is mounted is carried out. Next, the flow proceeds to the processing step 1204 through the route 1252. Whether or not the tape containing the volume is being mounted is judged as a result of retrieval by the processing step 1203, and the flow proceeds to the processing step 1211 through the route 1260 if the tape is being mounted, and proceeds to the processing 1205 through the route 1253 if it is not. In the processing step 1205, the physical device in-use flag 1082 on the physical device management table 1080 on the memory 1016 is read out by the use of the control line and the data line 1023, and whether or not the physical device which is out of use exists. The physical device to be used is selected and then the physical device in-use flag 1082 corresponding to the physical device to be used is set to the memory 1016 by the use of the control line 1207 and the data line 1023. After this processing is completed, the flow proceeds to the processing step 1206 through the route 1254 to judge whether or not the physical device which is not in use exists. If the physical device which is not in use does not exist, the flow proceeds to the processing step 1210 through the route 1259, and if the physical device which is not in use exists, the flow proceeds to the processing step 1207 through the route 1255.

In the processing 1207, the address of the selected physical device address is written to the physical device address corresponding to the logical device address of the logical device management table 1050 on the memory 1016 by the use of the control line 1027 and the data line 1023 and after this processing is completed, the flow proceeds to the processing step 1208 through the route 1256.

Next, in the processing 1208, the display command is designated to the selected physical device (MTU) 1110a–1110n through the control line 1025 and the data line 1021, and the load display command processing is executed for displaying the volume name (virtual volume name) for which the mount request is generated by the CPU 1010. After this command is executed, the flow proceeds to the processing step 1209 through the route 1257. Processing step 1209 judges whether or not the tape is mounted to the MTU 1110a–1110n is mounted. If the tape is mounted, the flow proceeds to the processing step 1212 through the route 1261. If the tape is not mounted, the flow enters the stand-by state while looping through the route 1258, until the tape is mounted.

Processing step 1212 judges whether or not the mounted tape is a new blank tape to which nothing is written, and if the tape is a new tape, the processing is completed through the route 1263. If the tape is not a new tape, the flow proceeds to the processing 1213 through the route 1264.

In the processing step 1213, the control data on this mounted tape is read out by the use of the control lines 1025, 1028, 1029 and the data lines 1021, 1022 and is written into the control data on the tape 1083 of FIG. 13 corresponding to the physical device address of the physical device management table 1080 on the memory 1016, through the control line 1027 and the data line 1023. After this processing is completed, the flow proceeds to step 1214 through the route 1265.

In the processing step 1214, the virtual volume position data 1054 corresponding to the logical device address of the logical device management table 1050 on the memory 1016 and the volume name 1055 are set to the table through the control line 1027 and the data line 1023, and after this processing is completed, the flow proceeds to the processing step 1215 through the route 1266. Next, in this processing step 1215, the virtual volume position data of the control data on the tape is designed to the virtual volume of the volume for which the mount request is generated by the CPU 1010, through the control line 1025 and the data line 1021 to activate the MTUs 1110a–1110n. Next, the instruction is given to the MTU side transfer circuit 1014 through the control line 1029 and the processing for positioning to the leading portion of the data region of this virtual volume is executed. After this processing is completed, the flow proceeds to the processing step 1216 through the route 1267.

In the processing step 1216, the data in the data region of the virtual volume thus positioned is designated to the corresponding logical device on the data buffer through the control line 1025 and the data line 1021, and the processing is thus completed. In the processing 1210, on the other hand, the processing for reporting that the logical device or the physical device is in use is executed, and this processing is completed through the route 1263.

In the processing step 1211, the physical device address at which the tape storing the volume as the object of the mount request from the CPU 1010 is mounted, is written to the physical device address 1053 corresponding to the logical device address of the logical device management table 1050 on the memory 1016, through the control line 1027 and the data line 1023, and then the flow proceeds to the processing step 1214 through the route 1262.

Figure 16:
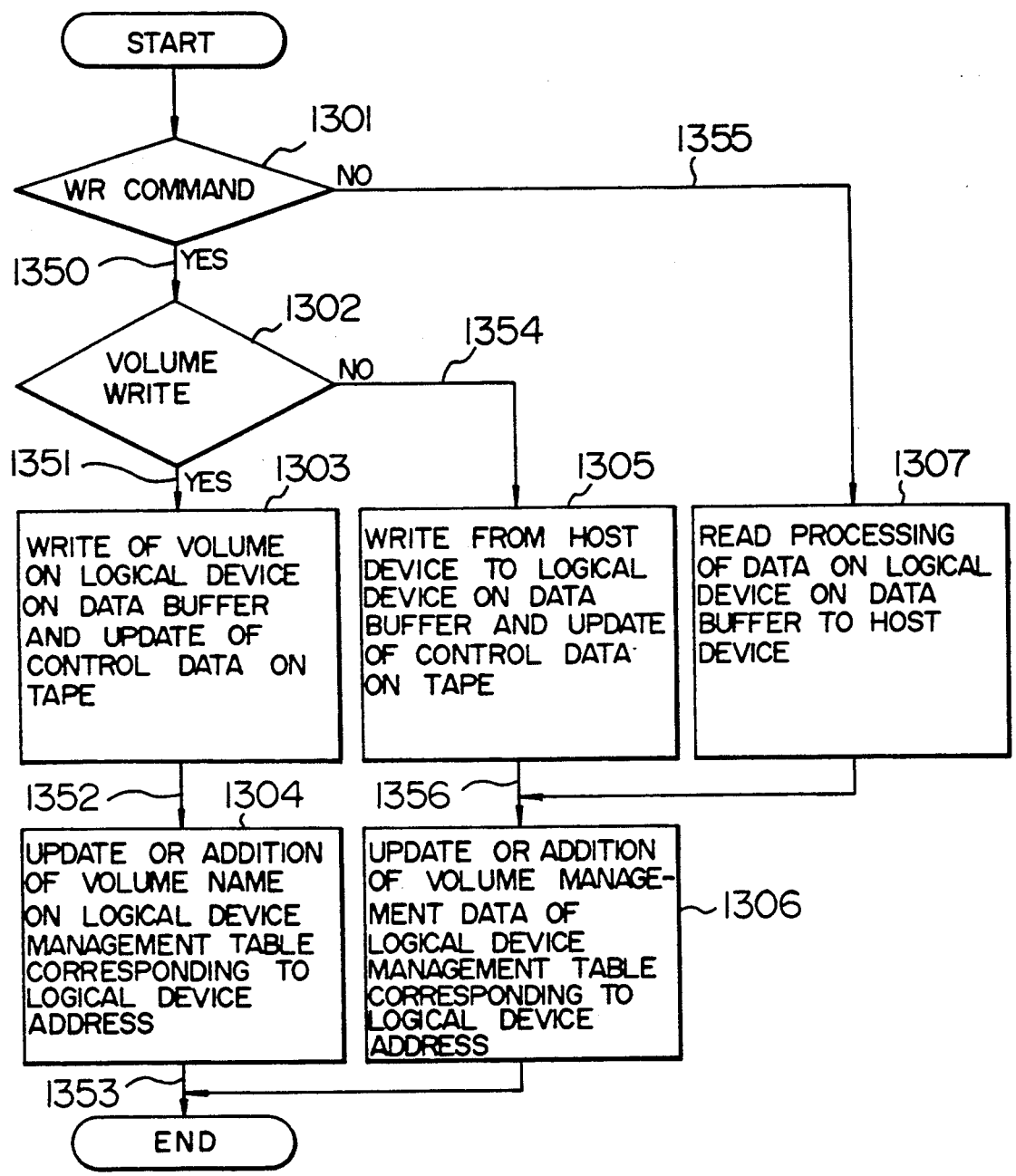
FIG. 16 is a flowchart of a processing in a magnetic tape control apparatus using the present invention.

FIG. 16 shows the data read/write processing flow when the RD or WR command is generated from the CPU 1010, on the logical device.

Processing step 1301 determines whether or not the command from the CPU 1010 is the WR command, and if it is the WR command, the flow proceeds to the processing step 1302 through the route 1350 and if it is not the WR command, the flow proceeds to the processing step 1307 through the route 1355. Next, processing step 1302 judges whether the WR command from the CPU is a volume write command or re-write command, and if it is not the volume write or re-write command (or in the case of ordinary data but not the volume), the flow proceeds to the processing step 1305 through the route 1354. If it is the volume write or re-write command, the flow proceeds to the processing step 1303 through the route 1351.

In the processing step 1303, the processing for writing the volume to the host device side transfer circuit 1013 and the data buffer 1002 from the CPU 1010 through the data line 1020, the control lines 1026 and the data line 1022 is executed and in this instance, the control data 1083 on the magnetic tape on the physical device management table 1080 of the memory 1016 is updated through the control line 1027 and the data line 1023. After this processing, the flow proceeds to the processing step 1304 through the route 1352.

In the processing step 1304, the volume name 1055 corresponding to the logical device address on the logical device management table 1050 of the memory 1016 is updated or added through the control line 1027 and the data line 1023, and the processing is completed.

Next, in the processing step 1305, the control data of the logical device is designated from the CPU 1010 to the host device side transfer circuit 1013 and to the data buffer 1002 through the control line 1024 and the data line 1020 and through the control lines 1026, 1028 and the data line 1022: respectively, and the data is written into the logical device on the data buffer 1002. In this instance, the control data 1083 on the magnetic tape on the physical device management table 1080 of the memory 1016 is updated through the control line 1083 and the data line 1023, and after this processing is completed, the flow proceeds to the step processing 1306 through the route 1356.

In the processing step 1306, the volume management data 1056 corresponding to the logical device address on the logical device management table 1050 of the memory 1016 is updated or added through the control line 1027 and the data line 1023, and the processing is completed.

In the processing step 1307, the control data of the logical device is designated from the logical device on the data buffer 1002 to the host device side transfer circuit 1013 and to the data buffer 1002 through the control line 1024 and the data line 1020 and through the control lines 1026, 1028 and the data line 1022, respectively, and after this processing is completed, the flow proceeds to the processing step 1306 through the route 1356.

Figure 17:
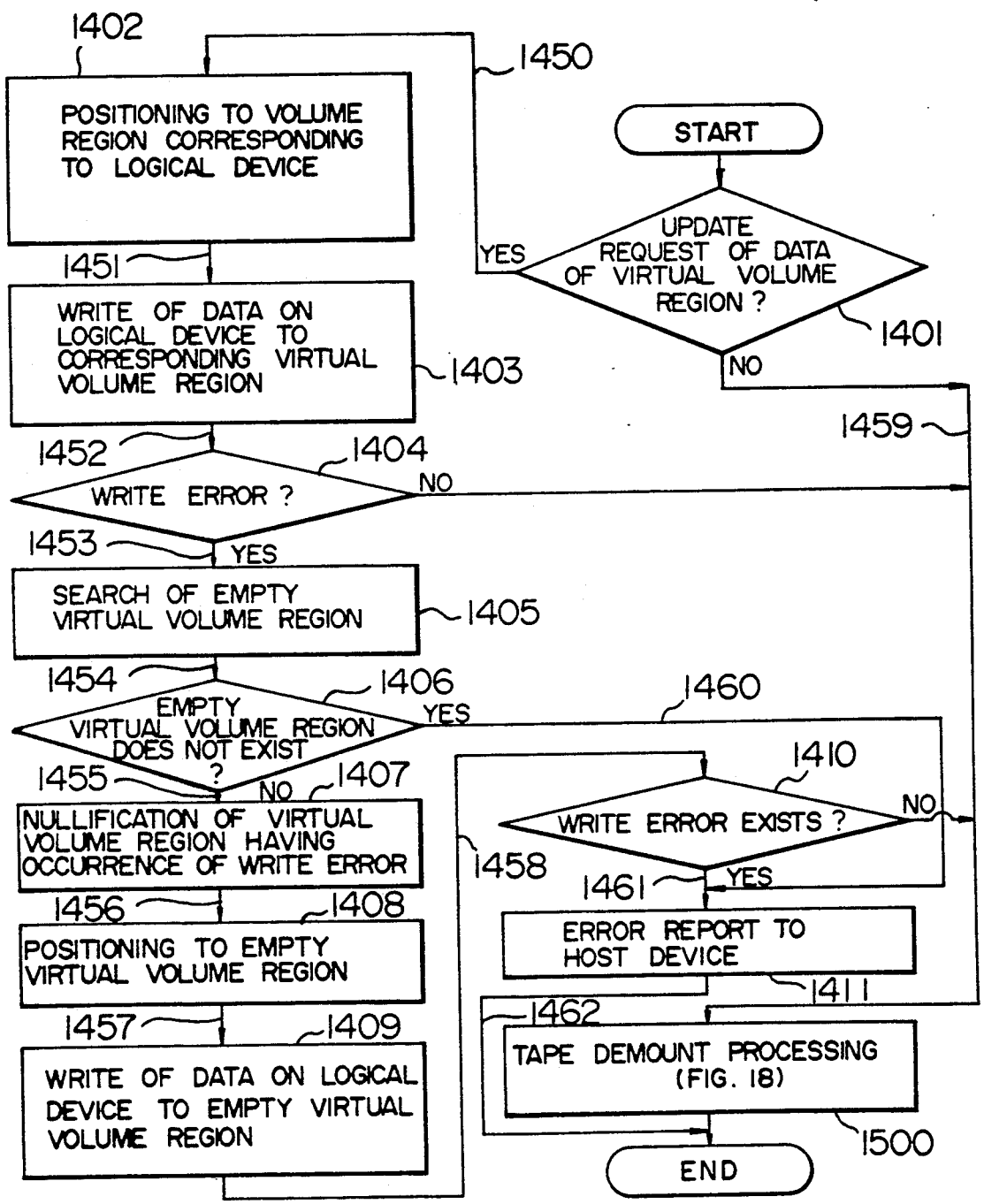
FIG. 17 is a flowchart of a processing in a magnetic tape control apparatus using the present invention.

FIG. 17 shows the processing flow for writing the data on the logical device to the corresponding virtual volume on the tape when the unload command is generated from the CPU 1010.

In the processing step 1401, the control data 1083 on the magnetic tape on the physical device management table 1080 of the memory 1016 is read out through the control line 1027 and the data line 1023, and whether or not the data on the logical device (the data of the virtual volume on the tape) is updated or added is judged. If updating or addition is made, the flow proceeds to the processing step 1402 through the route 1450, and if it is not, the flow proceeds to the processing step 1500 through the route 1459.

In the processing step 1402, the virtual volume position data corresponding to the logical device address of the logical device management table 1050 of the memory 1016 is read out through the control line 1027 and the data line 1023, and is assigned to the corresponding MTU 1110a-1110n through the control line 1025 and the data line 1021. This virtual volume position data is designated to the MTU side transfer circuit 1014 through the control line 1029 so as to execute the processing for positioning to the virtual volume on the tape. After this processing is completed, the flow proceeds to the processing step 1403 through the route 1451.

In the processing step 1403, the data write instruction to the virtual volume on the tape corresponding to the logical device on the data buffer is given to the MTU side transfer circuit 1014 and the data buffer 1002 through the control line 1025 and the data line 1021 and through the control lines 1028, 1029 and the data line 1022, respectively, and after the data is written to the data region of the virtual volume, the tape is positioned to the control data region of the virtual volume. Then, the write instruction of the control data 1083 on the magnetic tape of the physical device management table 1080 on the memory 1016 is given to the data buffer 1002 and the MTU side transfer circuit 1014 through the control lines 1025, 1027, 1028, 1029 and the data lines 1021-1023, and the control data is written to the control data region of the virtual volume on the MTU 1110a-1110n. After this processing is completed, the flow proceeds through the route 1452 to the processing step 1404 which judges whether or not any error occurs at the time of write to the tape.

In the processing step 1404, if the write error occurs, the flow proceeds to the processing 1405 through the route 1453 and if the write error does not occur, the flow proceeds to the processing 1500 through the route 1459.

In the processing step 1405, the control data on the magnetic tape corresponding to the physical device of the physical device management table of the memory 1016 is read out through the control line 1027 and the data line 1023, and the empty virtual volume on the tape is retrieved. After this processing is completed, the flow proceeds to the processing step 1406 through the route 1454.

The processing step 1406 judges whether or not the empty virtual volume exists on the tape, and if the empty virtual volume does not exist, the flow proceeds to the processing step 1411 through the routes 1460 and 1461. If the empty virtual volume exists, the flow proceeds to the processing 1407 through the route 1455.

Next, in the processing step 1407, the instruction processing for nullifying (erasing) the virtual volume, in which the write error occurs on the tape, is given to the MTU 1110a-1110n through the control line 1025 and the data line 1021 and after this processing is completed, the flow proceeds to the processing 1408 through the route 1456.

In this processing step 1408, the write instruction of the position data of the empty virtual volume is instructed to the corresponding MTU 1110a-1110n through the control line 1025 and the data line 1021, and the positioning processing to the empty virtual volume is executed by instructing the MTU side transfer circuit 1014 through the control line 1029. After this processing is completed, the flow proceeds to the processing step 1409 through the route 1457.

In the processing step 1409, the data write instruction into the virtual volume on the tape corresponding to the logical device on the data buffer is given to the MTU side transfer circuit 1014 and to the data buffer 1002 through the control line 1025 and the data line 1021 and through the control lines 1028, 1029 and the data line 1022, and after the data is written into the data region of the positioned empty virtual volume, the tape is positioned to the control data region of the empty virtual volume and the control data 1083 on the magnetic tape of the physical device management table 1080 of the memory 1016 is updated through the control line 1027 and the data line 1023. Furthermore, the write operation into the control data region of the empty virtual volume on the MTU 1110a-1110n is executed by instructing the write instruction to the data buffer 1002 and the MTU side transfer circuit 1014 through the control lines 1025, 1027, 1028, 1029 and the data lines 1021-1023. After this processing is completed, the flow proceeds to the processing step 1410 through the route 1458.

The processing step 1410 judges whether or not the write error occurs, and if it does, the flow proceeds to the processing step 1411 through the route 1461 and if it does not, the flow proceeds to the processing step 1500 through the route 1459.

In the processing step 1411, the processing for reporting the error to the CPU 1010 is executed through the data line 1020, and the processing is completed.

In the processing step 1500, the processing for demounting the tape from the MTU is executed in accordance with the processing flow shown in FIG. 18, and the processing is completed.

FIG. 18 shows the processing flow for removing (demounting) the magnetic tape from the MTU 1110a-1110n.

The processing 1501 retrieves whether or not other volume on the magnetic tape, in which the volume for which the demount request is made by the unload command from the CPU 1010 is stored, is used by other logical devices. In other words, whether or not the address, which is the same as the physical device address 1053 used by the logical device, and to the logical device in-use flag 1052 of which the flag is set, exists in the physical device address 1053 of the logical device management table, is read and retrieved through the control line 1027 and the data line 1023, and if the same address exists and the in-use flag is set, the address is judged as being used by other logical device, and the flow proceeds to the processing step 1503 through the route 1551. If the same address does not exist, the address is judged as not being used, and the flow proceeds to the processing step 1502 through the route 1550.

In the processing step 1502, the demount instruction of the magnetic tape is given to the MTU 1110a–1110n through the control line 1025 and the data line 1021 for execution, and after this processing is completed, the flow proceeds to the processing step 1503.

In the processing step 1503, the unload command completion is reported to the CPU 1010 through the control line 1024 and the data line 1020, and resetting of the logical device in-use flag corresponding to the logical device address of the logical device management table on the memory 1016 is made through the control line 1027 and the data line 1023, and the processing is completed.

The embodiment described above represents the case where the report that the device is in use is given to the CPU 1010 when the number of the logical devices 1003a–1003c is greater than that of the MTU 1110a–1110n and the tape cannot be mounted (fitted) to the MTU irrespective of the mount request from the CPU 1010 due to insufficiency of the MTU 1110a–1110n. In this case, there is also a system in which the MTC automatically demounts (removes) the tape that has already been mounted to the MTU 1110a–1110n, then the volume tape for which the mount request is generated from the CPU 1010 is mounted and the data of this volume is read to the logical device for the purpose of control. In this instance, the tape mounted to the MTU 1110a–1110n is demounted when the demount request is generated by the CPU 1010 for the volume which is automatically demounted, and the mount request of the tape of this volume is made by the MTC 1001 itself for the purpose of control.

When the mount request from the CPU 1010 is generated, the data of the virtual volume on the tape is stored in the logical device and thereafter this tape is demounted (removed from the MTU). When the demount request is generated from the CPU 1010, the MTC 1001 itself displays the mount request of this volume; and the data on the logical device (the stored data described above) is written into the volume regions which is mounted. Such a control system can also be used.

It is also possible to copy the data stored in a logical device on the data buffer 1002 to another logical device so as to once write the data to the tape, to make write-/read control of the data on the logical device at the copy destination without the need of reading again the data to the logical device, and to write the data to the corresponding volume on the tape at the time of unloading. For example, the data of the logical device 1 1003a is copied to the logical device 1003b, the data write-/read to the copying destination is made by the logical device 1 1003b, and the data of the logical device 1 1003b is written to the volume of the tape designated at the time of unloading.

When the data of other volume is sequentially combined with the data of the volume of the tape to write the data to the volume, it is also possible to read the data of this volume and the data of other volume to the respective logical devices, then to copy the data of the logical device, for which the data of this volume is read, to the back of the data of the logical device, for which the data of other volume is read, and thus to sequentially combine the data on the logical device. For example, the sequential merged data of the data of the logical device 0 1003a on the logical device 1 1003b can be obtained by copying the data of the logical device 1003a at the back of the data on the logical device 1 1003b by the use of the volume management data of the logical device management table 1050.

Although the present invention has thus been described about the case where the magnetic recording control apparatus (magnetic tape control apparatus) of the present invention is the magnetic tape by way of example; the present invention can be applied to magnetic recording media in general.

What is claimed is:

1. A magnetic recording control apparatus for controlling a magnetic recording device dealing with a large capacity type magnetic recording medium having a capacity of a plurality of normal capacity type magnetic recording media, said apparatus being connected to a host computer, comprising:
 a data buffer for storing data;
 a processor;
 a memory for storing control data; and
 a transmitter for transmitting data stored in said buffer to the magnetic recording device as a virtual volume, and transmitting control data to identify the virtual volume wherein said control data is recorded at either one of a head or a tail of the virtual volume on the magnetic recording medium,
 wherein a plurality of virtual volumes are stored in the magnetic recording medium and said processor stores information for identifying the virtual volume as said control data in said memory.

2. A magnetic recording control apparatus according to claim 1, wherein said large capacity type recording medium is a magnetic tape.

3. A magnetic recording control apparatus according to claim 2, wherein said magnetic tape is a cassette type magnetic tape which does not require rewinding of all tape when said magnetic tape is demounted from said magnetic recording control apparatus.

4. A magnetic recording control apparatus according to claim 3, wherein each of said control data contains location information of corresponding virtual volume and other virtual volumes stored in said magnetic tape.

5. A magnetic recording control apparatus according to claim 4, wherein said processor outputs an instruction to move a recording position of said magnetic tape to a region storing said control data and writes said control data when an access to said virtual volume is completed due to an instruction from said host computer and a tape demount instruction is generated from said host computer.

6. A magnetic recording control apparatus according to claim 5, wherein said processor searches said region storing said control data, and outputs an instruction for reading said control data, when receiving a signal from said host computer representing that said cassette type tape is mounted to said control apparatus.

7. A magnetic recording control apparatus for controlling a magnetic recording device dealing with a large capacity type magnetic recording medium having a capacity of a plurality of normal capacity type magnetic recording media, said apparatus being connected to a host computer, comprising:
- a data buffer for storing data, said data buffer being divided into a plurality of logical devices;
- a processor;
- a memory for storing control data; and
- a transmitter for transmitting data stored in said each of logical devices to the magnetic recording device as a virtual volume, and transmitting control data to identify the virtual volume such that the control data is recorded at either one of a head or a tail of said each virtual volume on the magnetic recording medium,
- wherein capacity of each logical device is equal to a capacity of a virtual volume, a plurality of virtual volumes are stored in the magnetic recording medium and said processor stores information for identifying the virtual volume as said control data in said memory.

8. A magnetic recording control apparatus according to claim 7, wherein the number of said logical devices on said data buffer is equal to the number of said virtual volumes.

9. A magnetic recording control apparatus according to claim 7, wherein data is read from said virtual volume into said logical device on said data buffer when receiving a mount request of said magnetic recording medium from said host computer, a write/read processing into and from said virtual volume is executed on said logical device, and data on said logical device is written into a corresponding virtual volume on said magnetic tape when receiving a demount request of said magnetic recording medium from said host computer.

10. A magnetic recording control apparatus according to claim 7, wherein coordination between a plurality of said logical devices and a plurality of said virtual volumes is automatically allotted by said magnetic recording control apparatus.

11. A magnetic recording control apparatus according to claim 7, wherein said logical devices on said data buffer are used for copying data on said logical devices to the logical devices.

12. A magnetic recording control apparatus according to claim 7, wherein said logical devices on said data buffer sequentially merge data on said logical devices to an end of data on other logical devices and write whole data into one logical device.

13. A magnetic recording control apparatus according to claim 7, wherein said large capacity type recording medium is a magnetic tape.

14. A magnetic recording control apparatus according to claim 7, wherein said transmitter detects a failure of writing data into said corresponding virtual volume on the magnetic recording medium when demounting of said magnetic recording medium due to an instruction from said host computer, and is responsive to detection of the failure to transmit said data into an empty virtual volume on said magnetic recording medium and nullify the failed virtual volume.

15. A magnetic recording control apparatus according to claim 7, wherein said transmitter does not transmit the data in said logical device to the virtual volume on the magnetic medium if the data in said logical device has not been updated.

16. In a magnetic recording control apparatus for controlling a magnetic recording device dealing with a large capacity type magnetic recording medium having a capacity of a plurality of normal capacity type magnetic recording media, connected to a host device, and said magnetic recording control apparatus comprising a data buffer, and a transmitter, a method for using a large capacity type magnetic recording medium as a plurality of normal capacity type magnetic recording media in parallel comprising the steps of:
- defining a plurality of virtual volumes on the large capacity type magnetic recording medium;
- storing control data in memory to identify the virtual volume in the magnetic recording device;
- defining a plurality of logical devices, each logical device corresponding to a virtual volume;
- assigning the logical devices to the data buffer;
- receiving data from the host device and storing the data temporarily in the logical devices which the host device designates; and
- transmitting data in the logical device with said control data to the corresponding virtual volume in the large capacity type magnetic recording medium.

* * * * *

UNITED STATES PATENT AND TRADEMARK OFFICE
CERTIFICATE OF CORRECTION

PATENT NO. : 5,327,535
DATED : July 5, 1994
INVENTOR(S) : Mikito Ogata, et al

It is certified that error appears in the above-indentified patent and that said Letters Patent is hereby corrected as shown below:

| Column | Line | |
|---|---|---|
| 6 | 8 | Change "Invention" to --invention--. |
| 6 | 10 | Delete "OF THE". |
| 6 | 11 | Delete entire line. |
| 11 | 29 | After "to" delete ",". |
| 16 | 64 | Change "step processing" to --processing step--. |
| 21 | 43 | Change "the" to --other--. |

Signed and Sealed this

Twentieth Day of December, 1994

Attest:

BRUCE LEHMAN

Attesting Officer     Commissioner of Patents and Trademarks